(12) United States Patent
Rosenberg et al.

(10) Patent No.: US 12,518,741 B2
(45) Date of Patent: Jan. 6, 2026

(54) ALIGNMENT PREDICTION TO INJECT TEXT INTO AUTOMATIC SPEECH RECOGNITION TRAINING

(71) Applicant: Google LLC, Mountain View, CA (US)

(72) Inventors: Andrew M. Rosenberg, Brooklyn, NY (US); Zhehuai Chen, Edgewater, NJ (US); Yu Zhang, Mountain View, CA (US); Bhuvana Ramabhadran, Mt. Kisco, NY (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 362 days.

(21) Appl. No.: 18/168,470

(22) Filed: Feb. 13, 2023

(65) Prior Publication Data
US 2023/0317059 A1     Oct. 5, 2023

Related U.S. Application Data

(60) Provisional application No. 63/269,631, filed on Mar. 20, 2022.

(51) Int. Cl.
*G10L 15/00*     (2013.01)
*G06F 40/289*    (2020.01)
(Continued)

(52) U.S. Cl.
CPC .......... *G10L 15/063* (2013.01); *G06F 40/289* (2020.01); *G10L 15/16* (2013.01); *G10L 15/197* (2013.01); *G10L 2015/0635* (2013.01)

(58) Field of Classification Search
CPC ....... G10L 15/16; G10L 15/063; G10L 15/22; G10L 15/26; G10L 15/197;
(Continued)

(56) References Cited

U.S. PATENT DOCUMENTS 11,017,761 B2 *   5/2021   Peng ...................... G10L 25/30
11,798,529 B2 *  10/2023   Zhu ....................... G10L 13/047
(Continued)

OTHER PUBLICATIONS

International Search Report and Written Opinion for the related Application No. PCT/US2023/062510, dated Jul. 12, 2023, 45 pages.

(Continued)

*Primary Examiner* — Abdelali Serrou
(74) *Attorney, Agent, or Firm* — Honigman LLP; Brett A. Krueger; Grant Griffith

(57) ABSTRACT

A method includes receiving training data that includes unspoken textual utterances, un-transcribed non-synthetic speech utterances, and transcribed non-synthetic speech utterances. Each unspoken textual utterance is not paired with any corresponding spoken utterance of non-synthetic speech. Each un-transcribed non-synthetic speech utterance not paired with a corresponding transcription. Each transcribed non-synthetic speech utterance paired with a corresponding transcription. The method also includes generating a corresponding alignment output for each unspoken textual utterance of the received training data using an alignment model. The method also includes pre-training an audio encoder on the alignment outputs generated for corresponding to the unspoken textual utterances, the un-transcribed non-synthetic speech utterances, and the transcribed non-synthetic speech utterances to teach the audio encoder to jointly learn shared speech and text representations.

18 Claims, 12 Drawing Sheets

(51) Int. Cl.
*G10L 15/06* (2013.01)
*G10L 15/16* (2006.01)
*G10L 15/197* (2013.01)

(58) Field of Classification Search
CPC ............ G10L 2015/0635; G10L 13/00; G10L 19/167; G10L 15/05; G10L 13/02; G10L 13/08; G10L 15/00; G10L 13/04; G10L 13/047; G10L 15/005; G10L 15/02; G10L 15/19; G10L 15/32; G10L 25/30; G10L 15/06; G10L 15/1815; G06F 40/279; G06F 1/03
See application file for complete search history.

(56) References Cited

U.S. PATENT DOCUMENTS

| | | | | |
|---|---|---|---|---|
| 12,046,236 | B2 * | 7/2024 | Kuo | G10L 15/04 |
| 12,243,513 | B2 * | 3/2025 | Zhu | G10L 13/08 |
| 2019/0318725 | A1 * | 10/2019 | Le Roux | G10L 17/00 |
| 2021/0350786 | A1 * | 11/2021 | Chen | G10L 13/08 |
| 2022/0020355 | A1 * | 1/2022 | Ming | G06F 40/253 |
| 2022/0230628 | A1 * | 7/2022 | Zhu | G10L 15/063 |
| 2023/0169281 | A1 * | 6/2023 | Zheng | G10L 15/28 |
| | | | | 704/2 |
| 2023/0223018 | A1 * | 7/2023 | Xing | G10L 15/22 |
| | | | | 704/232 |

OTHER PUBLICATIONS

Zhehuai Chen et al: "Maestro: Matched Speech Text Representations through Modality Matching", arxiv.org, Cornell University Library, 201 Olin Library Cornell University Ithaca, NY 14853, Jul. 1, 2022 (Jul. 1, 2022), XP091261450, 8 pages.

Ueno Sei et al: "Data Augmentation for ASA Using TTS Via a Discrete Representation", 2021 IEEE Automatic Speech Recognition and Understanding Workshop (ASRU), IEEE, Dec. 13, 2021 (Dec. 13, 2021), pp. 68-75, XP034077005, DOI: 10.1109/ASRU51503.2021.9688218 [retrieved on Jan. 20, 2022], 8 pages.

Jian Zhu et al: "Phone-to-audio alignment without text: A Semi-supervised Approach", arxiv.org, Cornell University Library, 201 Olin Library Cornell University Ithaca, NY 14853, Feb. 3, 2022 (Feb. 3, 2022), XP091156646, 5 pages.

Zhehuai Chen et al: "Injecting Text in Self-Supervised Speech Pretraining", arxiv.org, Cornell University Library, 201 Olin Library Cornell University Ithaca, NY 14853, Aug. 27, 2021 (Aug. 27, 2021), XP091039368, 5 pages.

\* cited by examiner

ALIGNMENT PREDICTION TO INJECT TEXT INTO AUTOMATIC SPEECH RECOGNITION TRAINING

CROSS REFERENCE TO RELATED APPLICATIONS

This U.S. Patent Application claims priority under 35 U.S.C. § 119(e) to U.S. Provisional Application 63/269,631, filed on Mar. 20, 2022. The disclosure of this prior application is considered part of the disclosure of this application and is hereby incorporated by reference in its entirety.

TECHNICAL FIELD

This disclosure relates to alignment prediction to inject text into automatic speech recognition training.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g. a low word error rate (WER)) and latency (e.g., delay between the user speaking and the transcription) based on the ongoing development of deep neural networks. However, one challenge in developing deep learning-based ASR models is that parameters of the ASR models tend to over fit the training data, thereby resulting in the ASR models having difficulties generalizing unseen data when the training data is not extensive enough. As a result, training ASR models on larger training datasets improves the accuracy of the ASR model. Synthesized speech and/or data-augmented speech can be incorporated to increase the volume of training data used to train the ASR models.

SUMMARY

One aspect of the disclosure provides a computer-implemented method that when executed on data processing hardware causes the data processing hardware to perform operations for pre-training an audio encoder to jointly learn shared representations of speech and text. The operations include receiving training data that includes unspoken textual utterances, un-transcribed non-synthetic speech utterances, and transcribed non-synthetic speech utterances. Each unspoken textual utterance is not paired with any corresponding spoken utterance of non-synthetic speech. Each un-transcribed non-synthetic speech utterance not paired with a corresponding transcription. Each transcribed non-synthetic speech utterance paired with a corresponding transcription. At operation, the method includes generating a corresponding alignment output for each unspoken textual utterance of the received training data using an alignment model. At operation, the method includes pre-training an audio encoder on the alignment outputs generated for corresponding to the unspoken textual utterances, the un-transcribed non-synthetic speech utterances, and the transcribed non-synthetic speech utterances to teach the audio encoder to jointly learn shared speech and text representations.

Implementations of the disclosure may include one or more of the following optional features. In some implementations, the audio encoder includes a stack of self-attention layers each including a multi-headed self-attention mechanism. In some examples, pre-training the audio encoder includes: for each un-transcribed non-synthetic speech utterance, generating a corresponding encoded representation of the un-transcribed non-synthetic speech utterance and pre-training the audio encoder on a contrastive loss applied on the corresponding encoded representation of the un-transcribed non-synthetic speech utterance; for each alignment output, generating a corresponding encoded representation of the alignment output and pre-training the audio encoder on a contrastive loss applied on the corresponding encoded representation of the alignment output; and for each transcribed non-synthetic speech utterance, generating a corresponding encoded representation of the transcribed non-synthetic speech utterance and pre-training the audio encoder on a contrastive loss applied on the corresponding encoded representation of the transcribed non-synthetic speech utterance.

In some implementations, pre-training the audio encoder include includes: at each of a plurality of time steps for each alignment output, generating, using an auxiliary decoder, a first probability distribution over possible synthetic speech recognition hypotheses for the corresponding alignment output, determining an alignment output loss based on the first probability distribution over possible synthetic speech recognition hypotheses and the unspoken textual utterance corresponding to the alignment output, and pre-training the audio encoder based on the alignment output loss term; and at each of a plurality of time steps for each transcribed non-synthetic speech utterance, generating, using the auxiliary decoder, a second probability distribution over possible non-synthetic speech recognition hypotheses for the corresponding transcribed non-synthetic speech utterance, determining a non-synthetic speech loss term based on the second probability distribution over possible non-synthetic speech recognition hypotheses and the corresponding transcription paired with the transcribed non-synthetic speech utterance, and pre-training the audio encoder based on the non-synthetic speech loss term. In these implementations, the auxiliary decoder may include one of a Connection Temporal Classification (CTC) decoder, a Listen Attend Spell (LAS) decoder, or Recurrent Neural Network-Transducer (RNN-T) decoder. Here, the first probability distribution over possible synthetic speech recognition hypotheses may include one of the possible phoneme labels or possible world piece labels and the second probability distribution over possible non-synthetic speech recognition hypotheses includes the one of the possible phoneme labels or the possible word piece labels.

In some examples, the audio encoder includes a text encoder, a speech encoder, and a shared encoder. In these examples, the operations may further include: for each alignment output, determining an encoded textual representation of the alignment output using the text encoder and generating, using the shared encoder, a first encoded shared representation of the alignment output in a shared latent representation space; and for each transcribed non-synthetic speech utterance, determining an encoded audio representation of the transcribed non-synthetic speech utterance using the speech encoder and generating, using the shared encoder, a second encoded shared representation of the transcribed non-synthetic speech utterance in a shared latent representation space.

Generating the corresponding alignment output for each unspoken textual utterance of the received training data may include extracting an initial textual representation from the unspoken textual utterance, predicting a text chunk duration for each text chunk in the unspoken textual utterance, and upsampling the initial textual representation using the predicted text chunk duration for each text chunk in the unspoken textual utterance. In some implementations, the operations further include training the alignment model by generating an encoded audio representation for a transcribed non-synthetic speech utterance using a speech encoder, determining an alignment output for a transcription corresponding to the transcribed non-synthetic speech utterance using the alignment model, generating an encoded textual representation for the alignment output, and updating parameters of the alignment model based on a comparison of the encoded audio representation for the transcribed non-synthetic speech utterance and encoded textual representation for the alignment output.

Another aspect of the disclosure provides a system that includes data processing hardware and memory hardware storing instructions that when executed on the data processing hardware causes the data processing hardware to perform operations. The operations include receiving training data that includes unspoken textual utterances, un-transcribed non-synthetic speech utterances, and transcribed non-synthetic speech utterances. Each unspoken textual utterance is not paired with any corresponding spoken utterance of non-synthetic speech. Each un-transcribed non-synthetic speech utterance not paired with a corresponding transcription. Each transcribed non-synthetic speech utterance paired with a corresponding transcription. At operation, the method includes generating a corresponding alignment output for each unspoken textual utterance of the received training data using an alignment model. At operation, the method includes pre-training an audio encoder on the alignment outputs generated for corresponding to the unspoken textual utterances, the un-transcribed non-synthetic speech utterances, and the transcribed non-synthetic speech utterances to teach the audio encoder to jointly learn shared speech and text representations.

Implementations of the disclosure may include one or more of the following optional features. In some implementations, the audio encoder includes a stack of self-attention layers each including a multi-headed self-attention mechanism. In some examples, pre-training the audio encoder includes: for each un-transcribed non-synthetic speech utterance, generating a corresponding encoded representation of the un-transcribed non-synthetic speech utterance and pre-training the audio encoder on a contrastive loss applied on the corresponding encoded representation of the un-transcribed non-synthetic speech utterance; for each alignment output, generating a corresponding encoded representation of the alignment output and pre-training the audio encoder on a contrastive loss applied on the corresponding encoded representation of the alignment output; and for each transcribed non-synthetic speech utterance, generating a corresponding encoded representation of the transcribed non-synthetic speech utterance and pre-training the audio encoder on a contrastive loss applied on the corresponding encoded representation of the transcribed non-synthetic speech utterance.

In some implementations, pre-training the audio encoder include includes: at each of a plurality of time steps for each alignment output, generating, using an auxiliary decoder, a first probability distribution over possible synthetic speech recognition hypotheses for the corresponding alignment output, determining an alignment output loss based on the first probability distribution over possible synthetic speech recognition hypotheses and the unspoken textual utterance corresponding to the alignment output, and pre-training the audio encoder based on the alignment output loss term; and at each of a plurality of time steps for each transcribed non-synthetic speech utterance, generating, using the auxiliary decoder, a second probability distribution over possible non-synthetic speech recognition hypotheses for the corresponding transcribed non-synthetic speech utterance, determining a non-synthetic speech loss term based on the second probability distribution over possible non-synthetic speech recognition hypotheses and the corresponding transcription paired with the transcribed non-synthetic speech utterance, and pre-training the audio encoder based on the non-synthetic speech loss term. In these implementations, the auxiliary decoder may include one of a Connection Temporal Classification (CTC) decoder, a Listen Attend Spell (LAS) decoder, or Recurrent Neural Network-Transducer (RNN-T) decoder. Here, the first probability distribution over possible synthetic speech recognition hypotheses may include one of the possible phoneme labels or possible world piece labels and the second probability distribution over possible non-synthetic speech recognition hypotheses includes the one of the possible phoneme labels or the possible word piece labels.

In some examples, the audio encoder includes a text encoder, a speech encoder, and a shared encoder. In these examples, the operations may further include: for each alignment output, determining an encoded textual representation of the alignment output using the text encoder and generating, using the shared encoder, a first encoded shared representation of the alignment output in a shared latent representation space; and for each transcribed non-synthetic speech utterance, determining an encoded audio representation of the transcribed non-synthetic speech utterance using the speech encoder and generating, using the shared encoder, a second encoded shared representation of the transcribed non-synthetic speech utterance in a shared latent representation space.

Generating the corresponding alignment output for each unspoken textual utterance of the received training data may include extracting an initial textual representation from the unspoken textual utterance, predicting a text chunk duration for each text chunk in the unspoken textual utterance, and upsampling the initial textual representation using the predicted text chunk duration for each text chunk in the unspoken textual utterance. In some implementations, the operations further include training the alignment model by generating an encoded audio representation for a transcribed non-synthetic speech utterance using a speech encoder, determining an alignment output for a transcription corresponding to the transcribed non-synthetic speech utterance using the alignment model, generating an encoded textual representation for the alignment output, and updating parameters of the alignment model based on a comparison of the encoded audio representation for the transcribed non-synthetic speech utterance and encoded textual representation for the alignment output.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
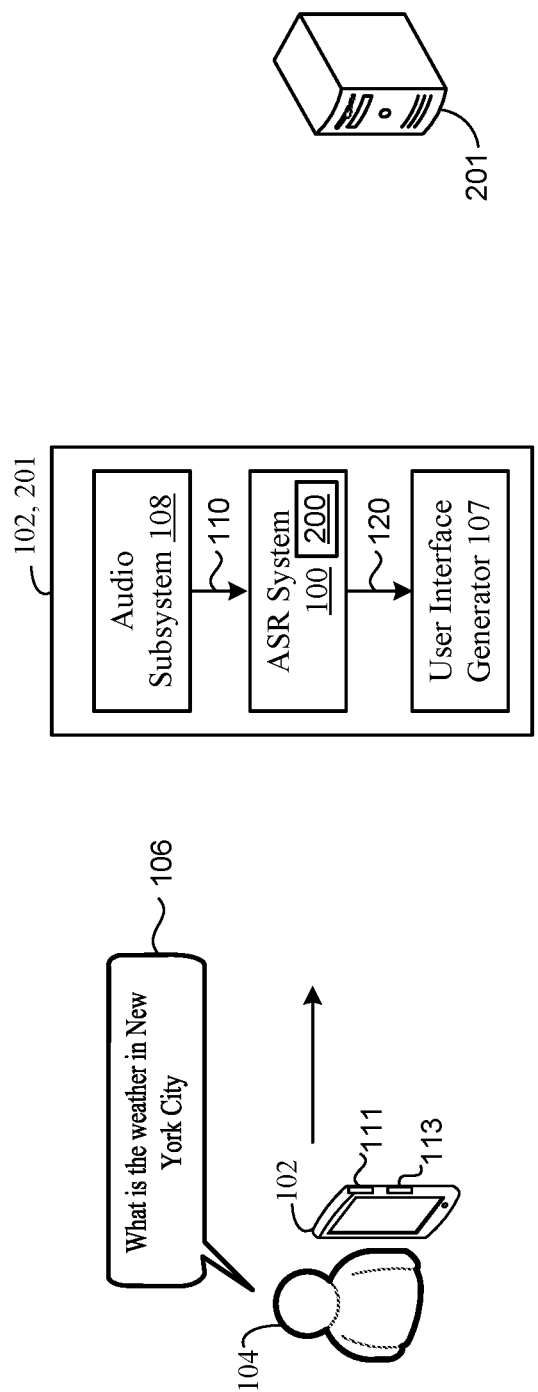
FIG. 1 is a schematic view of an example speech recognition system.

Automated speech recognition has made tremendous strides with the introduction of sequence to sequence (Seq2Seq) models that map from audio to character sequences. At the same time, text-to-speech (TTS) or speech syntheses systems have successfully applied Seq2Seq models to obtain state of the art natural, realistic sounding synthesized speech that can be indistinguishable to the human ear from human speech.

One challenge in developing deep learning-based ASR models is that parameters of the ASR models tend to over fit the training data, thereby resulting in the ASR models having difficulties generalizing unseen data when the training data is not extensive enough. Thus, training ASR models on larger training datasets improves the accuracy of the ASR model. For instance, the use of machine learning or other statistical methods can train ASR models on training data sets that include upwards of 10,000 hours of transcribed speech. Yet, performance of ASR models suffers when a domain associated with the training data is distinct from a domain at which the ASR model will be deployed during inference. For example, training an ASR model on transcribed speech in a domain associated with video meetings would be less effective in recognizing speech related to voice search queries, and vice versa.

Unpaired text data has the potential to drastically limit the amount of labeled human speech required to train ASR models, while also providing flexibility in moving the ASR model across different domains. Using text data (i.e., unpaired text data) in addition to speech data to train ASR models, however, presents a challenge with combining speech and text modalities of the training data. One current approach uses multi-task training to train a single model with different objectives for each modality. This approach suffers from interference and capacity limitations given the different nature and objectives for each modality of the training data. Another current approach includes TTS systems that synthesize unpaired text data to generate synthesized speech (i.e., modality conversion). Yet, using synthesized speech based on text data to train ASR models has shown to impact ASR training differently than human speech, despite instances of state of the art synthesized speech being indistinguishable from human speech. This gap between synthesized speech and human speech is attributed to mismatches in the synthesized speech data from the human speech data that arise from the difficult one-to-many mapping problem that TTS systems are trying to solve. Namely, while the aggregate quality of available synthesized speech is very high, the synthesized speech exhibits much less variation than human speech, as well as minimal speech disfluencies. As a result, using synthesized speech based on unpaired text data to train ASR models presents a difficulty for generalizing real speech utterances during inference.

Implementations herein are directed toward aligning text representations used for generating synthesized speech with corresponding non-synthetic speech representations in a latent representation space for training ASR models. That is, an alignment model may generate alignment outputs for unspoken textual utterances when large amounts of transcribed speech (e.g., non-synthetic speech) in a target domain and/or target language for training the ASR model is not available or less prevalent. More specifically, implementations are directed toward pre-training an audio encoder of the ASR model on training data that includes un-transcribed non-synthetic speech utterances, unspoken textual utterances for generating corresponding alignment outputs, and the transcribed non-synthetic speech utterances to jointly learn speech and text representations, and then fine-tuning (e.g., warm-start training) the pre-trained ASR model using the available transcribed non-synthetic speech utterances. Notably, generating the alignment outputs for the unspoken textual utterances (e.g., without converting the textual utterances to speech) promotes a computationally efficient aligned representation between the text and speech modalities of the training data. As will become apparent, the pre-training of the audio encoder includes updating parameters of the audio encoder based on a combination of contrastive self-supervised losses, supervised losses, and consistency losses derived from the training data. The ASR model may include a monolingual ASR model or a multilingual ASR model. Moreover, the learned representation between the text and speech modalities may be used for speech translation models as well.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with input acoustic frames 110 capable of being processed by the ASR system 100. In the example shown, the user speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Figure 2:
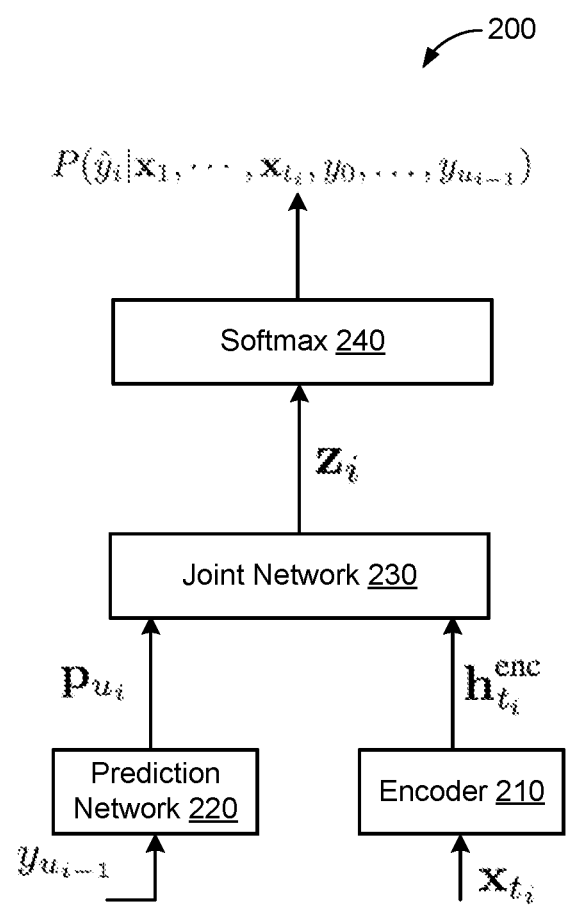
FIG. 2 is a schematic view of a Recurrent Neural Network-Transducer (RNN-T) model architecture.

Referring to FIG. 2, an example frame alignment-based transducer model 200 includes a Recurrent Neural Network-Transducer (RNN-T) model architecture which adheres to latency constrains associated with interactive applications. The use of the RNN-T model architecture is exemplary, and the frame alignment-based transducer model 200 may include other architectures such as transformer-transducer and conformer-transducer model architectures among others. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $x_t \in \mathbb{R}_d$, and produces at each output step a higher-order feature representation. This higher-order feature representation is denoted as $$h_1^{enc}, \ldots, h_T^{enc}.$$

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces, phonemes, and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network (i.e., audio encoder) 210 of the RNN-T model 200 includes a stack of self-attention layers/blocks, such as conformer blocks. Here, each conformer block includes a series of multi-headed self attention, depth wise convolution and feed-forward layers. The prediction network 220 may have two 2,048-dimensional LSTM layers, each of which is also followed by 640-dimensional projection layer. Alternatively, the prediction network 220 may include a stack of transformer or conformer blocks, or an embedding look-up table in lieu of LSTM layers. Finally, the joint network 230 may also have 640 hidden units. The Softmax layer 240 may be composed of a unified word piece or grapheme set that is generated using all unique word pieces or graphemes in a plurality of training data sets.

Figure 3A:
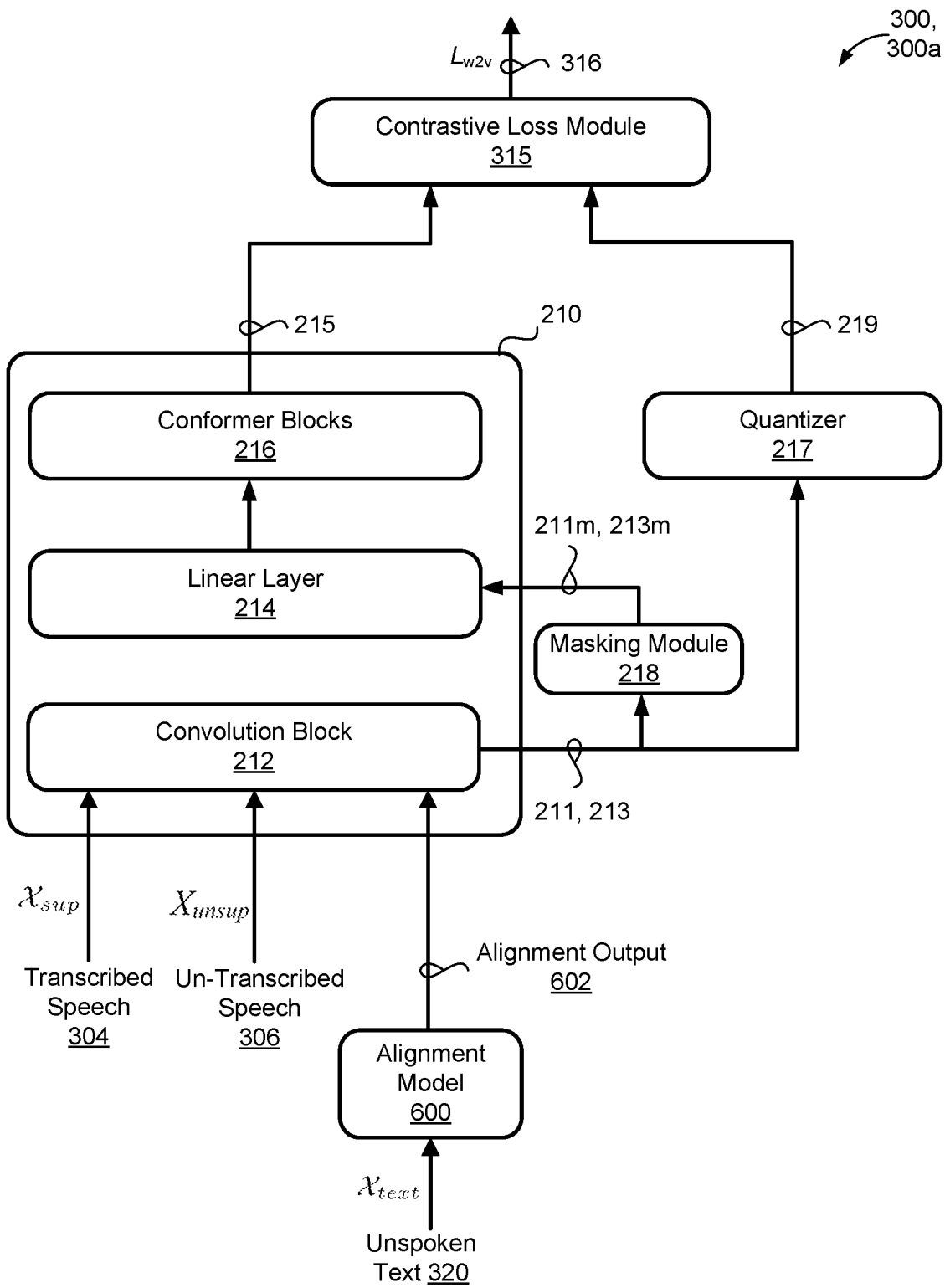
FIGS. 3A-3C are schematic views of an example training process for pre-training an audio encoder of a speech recognition model.
Figure 3B:
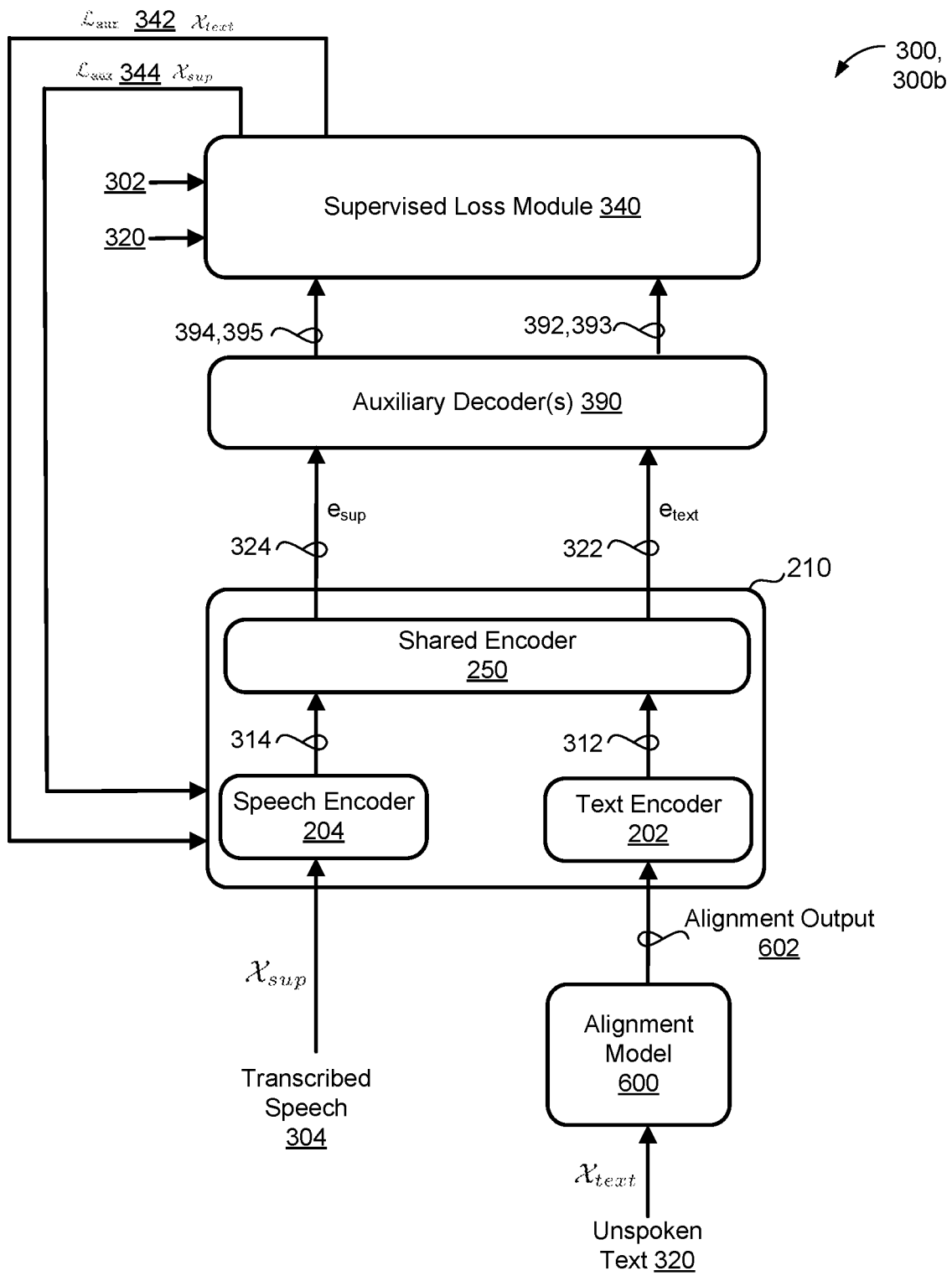
Figure 3C:
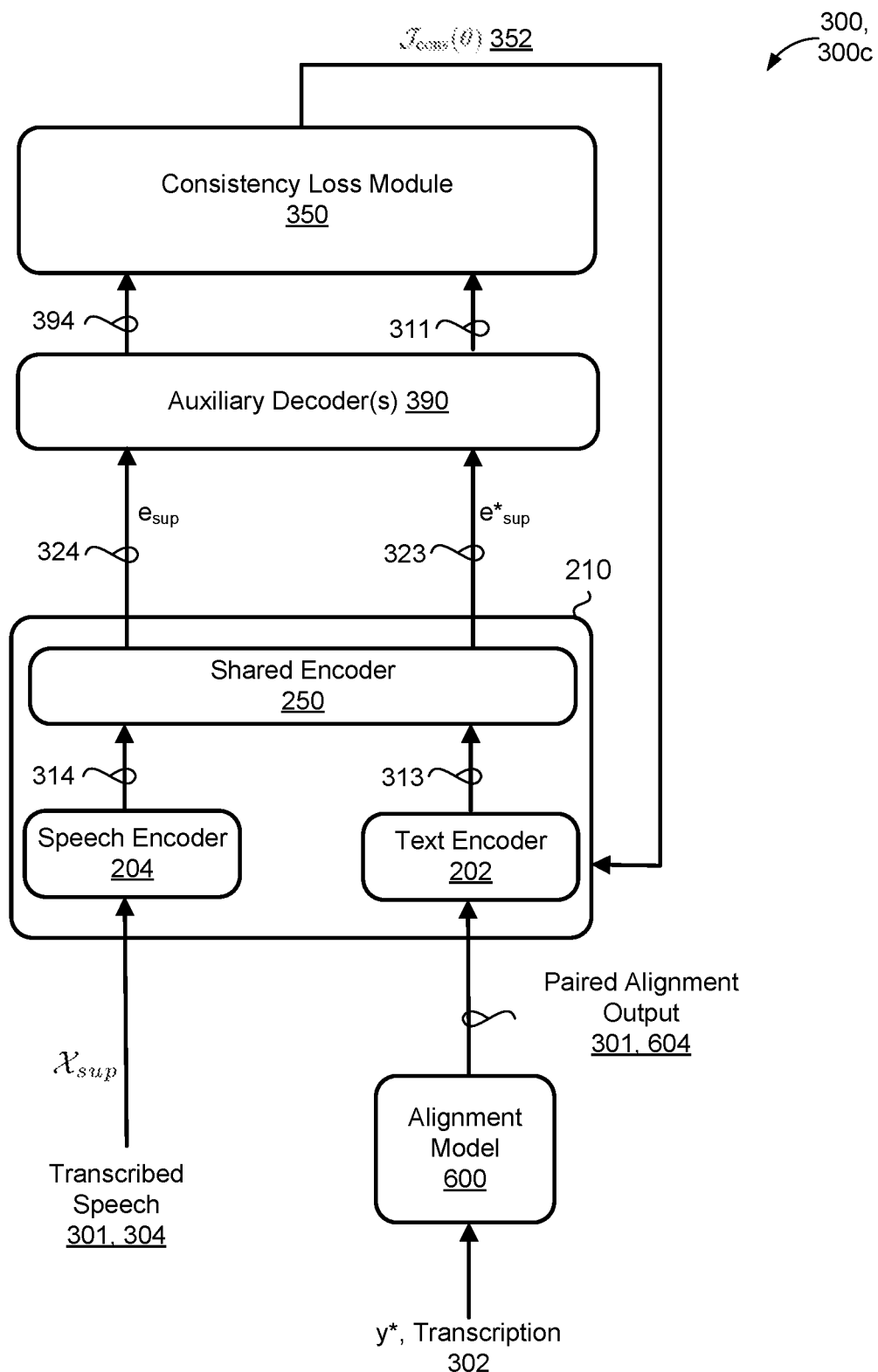

FIGS. 3A-3C illustrate an example training process 300 for pre-training the audio encoder 210 of the ASR model 200 (FIG. 2). The training process 300 may pre-train the audio encoder 210 using available training data that includes a set of unspoken textual utterances ($X_{text}$) 320, a set of transcribed non-synthetic speech utterances ($X_{sup}$) 304, and/or un-transcribed non-synthetic speech utterances ($X_{unsup}$) 306. Each unspoken textual utterance 320 includes text-only data (i.e., unpaired data) such that each unspoken textual utterance 320 is not paired with any corresponding spoken audio representation (i.e., speech) of the utterance. The unspoken textual utterance 320 may include any sequence text chunks including words, word-pieces, phonemes, and/or graphemes. Each un-transcribed non-synthetic speech utterance 306 (also referred to as simply "un-transcribed speech utterance 306") includes audio-only data (i.e., unpaired data) such that the un-transcribed speech utterance 306 is not paired with any corresponding transcription. On the other hand, each transcribed non-synthetic speech utterance 304 (also referred to as simply "transcribed speech utterance 304") includes a corresponding transcription 302 paired with a corresponding non-synthetic speech representation of the corresponding transcribed speech utterance 304.

For simplicity, the training process 300 includes a contrastive self-supervised loss part 300a (FIG. 3A), a supervised loss part 300b (FIG. 3B), and a consistency regularization part 300c (FIG. 3C). The training process 300 pre-trains the audio encoder 210 on a total loss ($L_{tts4pretrain2}$) based on: contrastive losses ($L_{w2v}$) 316 derived using the contrastive self-supervised loss part 300a from the unspoken training text utterances ($X_{text}$) 320, a corpus of transcribed non-synthetic speech utterances ($X_{sup}$) 304, and un-transcribed non-synthetic speech utterances ($X_{unsup}$) 306; supervised losses (Laux) 342, 344 derived using the supervised loss part 300b from the unspoken training text utterances ($X_{text}$) 320 and the transcribed non-synthetic speech utterances ($X_{sup}$) 304; and consistency losses ($\mathcal{J}_{cons}(\theta)$) 352 derived using the consistency regularization part 300c.

Referring to FIG. 3A, the contrastive self-supervised loss part 300a of the training process 300 may employ an alignment model 600 that is configured to generate, at each of a plurality of output steps, alignment outputs (i.e., textual representation) 602 for each of a plurality of unspoken training text utterances 320. The unspoken textual utterances 320 (also referred to as simply "unspoken textual utterance 320") includes unspoken text that is text-only data, i.e., unpaired data, such that each unspoken textual utterance ($X_{text}$) 320 is not paired with any synthesized or non-synthesized speech. Accordingly, the alignment model 600 generates a corresponding alignment output 602 for each of the unspoken textual utterances 320.

Figure 6:
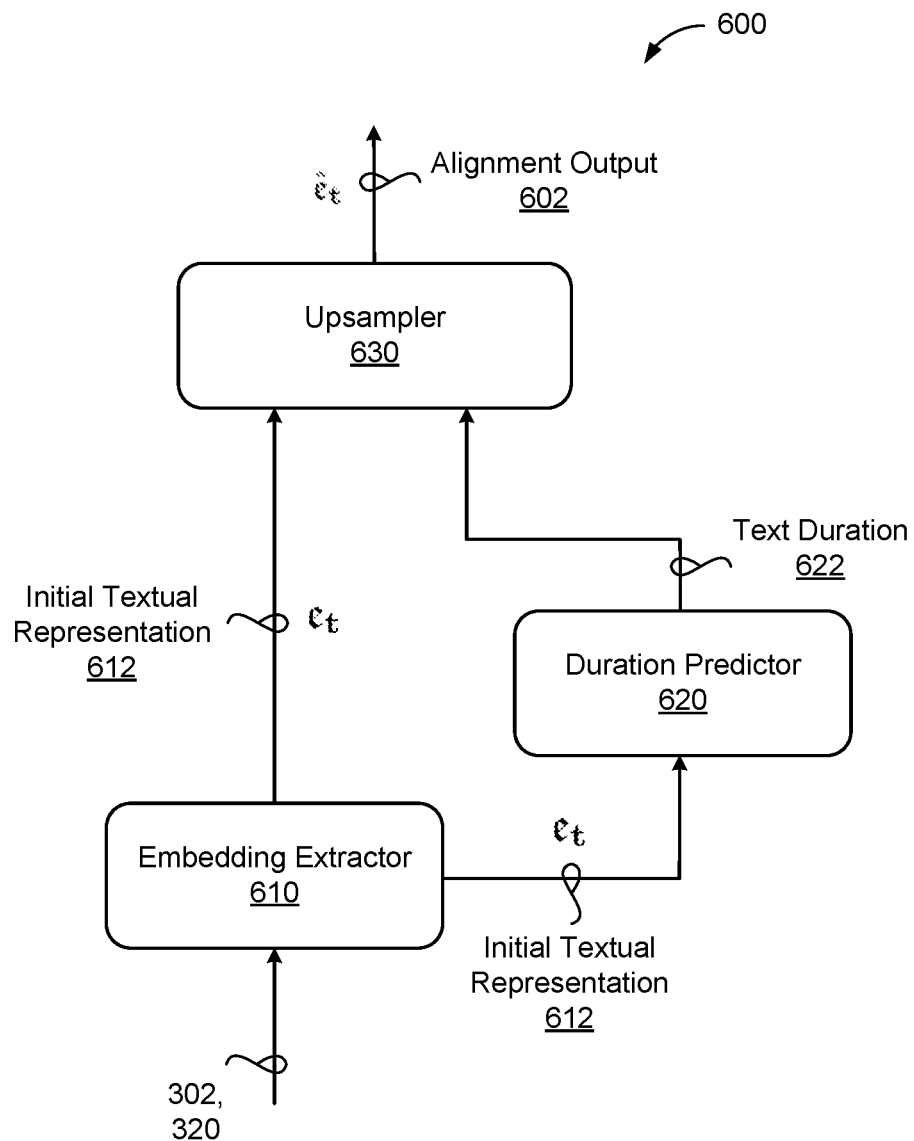
FIG. 6 is a schematic view of an alignment model used during the example training process for pre-training the audio encoder of the speech recognition model in FIGS. 3A-3C.

Referring now to FIG. 6, in some examples, the alignment model 600 includes an embedding extractor 610, duration predictor 620, and an upsampler 630. The embedding extractor 610 receives the unspoken textual utterance 320 that includes a sequence of text chunks including words, word-pieces, phonemes, and/or graphemes and extracts a corresponding initial textual representation ($e_t$) 612. The initial textual representation 612 includes embedding lexical information from the unspoken textual utterance 320. Additionally or alternatively, the embedding extractor 610 may receive a transcription 302 corresponding to a transcribed non-synthetic speech utterance 304 (FIG. 3C). The duration predictor 620 receives the initial textual representation 612 from the embedding extractor 610 and predicts a corresponding text chunk duration (i.e., word, word-piece, phoneme, and/or grapheme duration) 622. The text chunk duration 622 indicates a duration the corresponding text chunk would be spoken if a human (or text-to-speech system) spoke the unspoken textual utterance 320. For example, the unspoken textual utterance 320 may include a sequence of phonemes and the duration predictor 620 predicts a phoneme duration 622 for each phoneme in the sequence of phonemes. In this example, the duration predictor 620 predicts the phoneme duration 622 by predicting a probability of non-zero duration for each phoneme and predicting a probability of continuous phoneme duration for each phoneme. As the sequence of phonemes includes regular phonemes, silences between word boundaries, and punctuation marks, only the regular phonemes are associated with non-zero duration while the silences and punctuation marks are generally associated with the continuous phoneme duration.

Accordingly, the duration predictor 620 may use a sigmoid activation following a first one of two independent activations to predict the probability of non-zero duration and use a soft plus activation following a second one of the two independent projections to predict the continuous text chunk duration 622 for each text chunk. The duration predictor 620 determines, for each text chunk, whether the probability of non-zero duration is less than a threshold value, and when the probability of non-zero duration is less than the threshold value, a multiplier may zero-out the continuous text chunk duration 622 predicted by the softplus activation for the corresponding text chunk. Otherwise, when the probability of non-zero duration is not less than the threshold value, the predicted text chunk duration 622 may be set equal to the continuous phoneme duration predicted by the softplus activation.

The upsampler 630 receives, for each unspoken textual utterance 320, the corresponding initial textual representation 612 and the predicted text chunk duration 622, and generates an alignment output ($\hat{e}_t$) 602 having a number of frames by upsampling the initial textual representation 612 using the corresponding predicted text chunk duration 622. In some examples, the alignment model 600 sends the alignment output 602 to a text encoder 202 of the audio encoder 210 (FIGS. 3B and 3C). In other examples (not shown), the alignment model 600 sends the alignment output 602 to a shared encoder 250 (e.g., bypassing the text encoder 202) of the audio encoder 210 (FIGS. 3B and 3C). In these other examples, the alignment output 602 serves as the encoded textual representation 312 such that the shared encoder 250 may receive the alignment output 602 directly from the alignment model 600 (FIGS. 3B and 3C). In some additional examples, paired training data is available and the upsampler 630 generates the alignment output 602 as follows.

$$\hat{e}_t = \theta_{Refiner}(\text{Resample}(e_t, \text{Align}_{RNN-T}(e_s, t))) \quad (1)$$

Here, the upsampler includes resampler and refiner layers that align the initial textual embedding 612 to align with a corresponding encoded audio representation 314 (FIGS. 3B and 3C) directly. In other examples, paired training data is not available and the upsampler 630 generates the alignment output 602 as follows.

$$\hat{e}_t = \theta_{Refiner}(\text{Resample}(e_t, \theta_{duration}(e_t))) \quad (2)$$

In particular, the number of frames of the alignment output 602 indicates a predicted speech duration of the unspoken textual utterance 320. Stated differently, the number of frames of the alignment output 602 maps (i.e., aligns) the sequence of text chunks of the unspoken textual utterance 320 to speech frames. Here, the upsampler 630 includes resampler and refiner layers that replicate the initial textual embedding 612 to match the predicted text chunk duration 622 (i.e., speech duration). As such, the alignment output 602 includes a textual representation of the unspoken textual utterance 320 having a timing component that aligns with how a human would speak the unspoken textual utterance 320.

Notably, in most instances, a text-to-speech (TTS) system generates an audible output to give the unspoken textual utterance 320 the timing component of human speech such that a training process may use the audible output (i.e., synthetic speech) to train the audio encoder 210. Thus, since alignment model 600 generates the alignment output 602 that maps the sequence of text chunks to speech frames directly, the training process 300 does not require any TTS system to train the audio encoder 210 using unspoken textual utterances 320. That is, the alignment model 600 does not convert the unspoken textual utterance 320 to generate synthetic speech.

Figure 7:
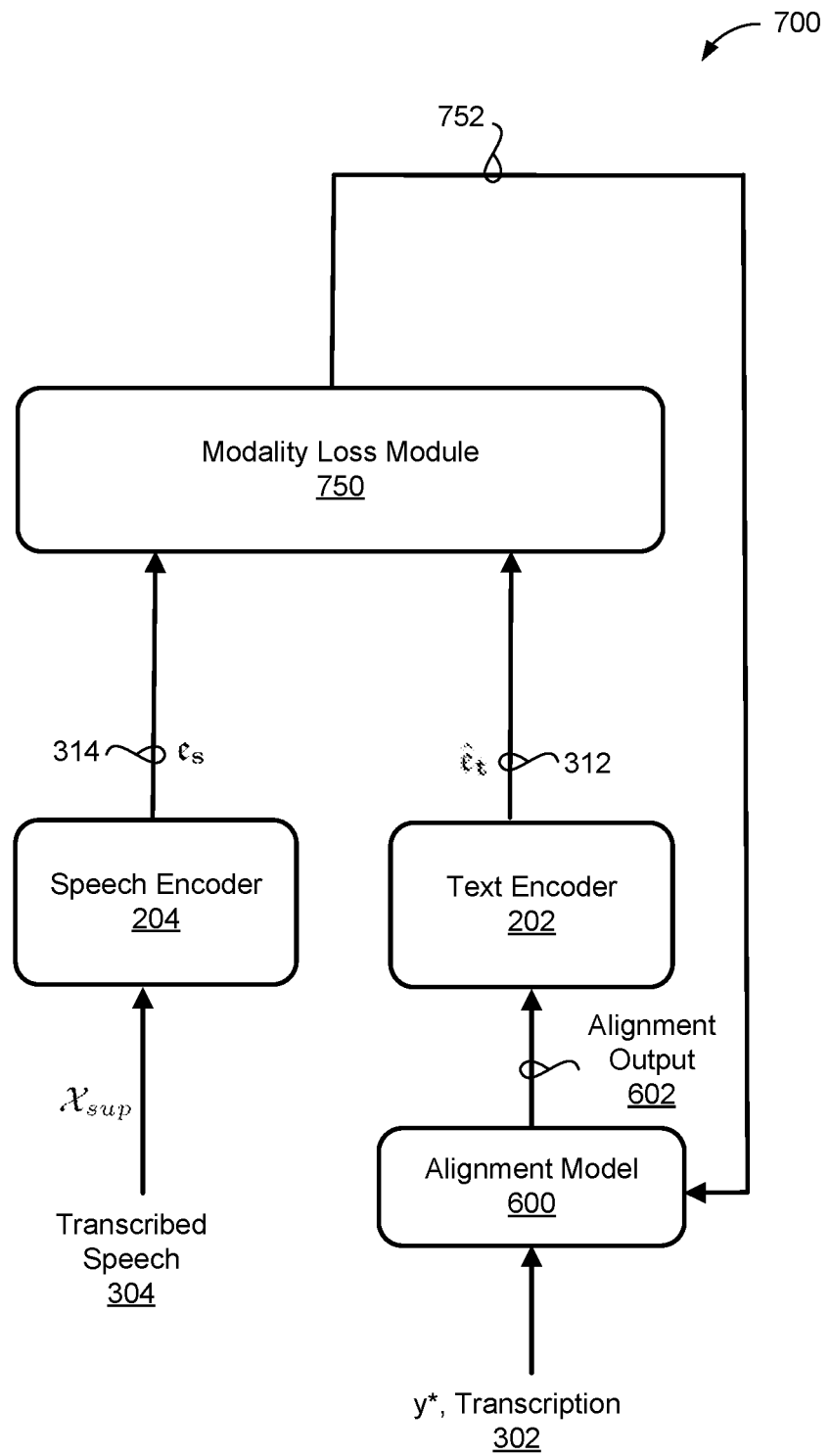
FIG. 7 is a schematic view of an example training process for training a duration predictor of the alignment model.

FIG. 7 illustrates an example training process 700 for training the alignment model 600 using transcribed non-synthetic speech utterances 304 that have corresponding transcriptions 302 (i.e., paired training data). In the example shown, the speech encoder 204 receives, as input, each transcribed non-synthetic speech utterance 304 as a sequence of features/vectors (e.g., mel-frequency spectrograms such as the acoustic frames 110 of FIG. 1) and generates, as output, for each of a plurality of time steps, an encoded audio representation ($e_s$) 314 that corresponds to the transcribed non-synthetic speech utterance 304 at the corresponding time step. In parallel, the alignment model 600 receives the transcription 302 corresponding to the same non-synthetic speech utterance 304 and generates an alignment output 602 according to Equation 1. The text encoder 202 receives, as input, the alignment output 602 and generates, as output, for each of a plurality of time steps, an encoded textual representation ($e_t$) 312 that corresponds to the transcription 302 at the corresponding time step.

A modality loss module 750 receives the encoded textual representation 312 and the encoded audio representation 314 and generates a modality loss 752 based on comparing the encoded textual representation 312 and the encoded audio representation as follows.

$$\mathcal{L}_{MM} = \text{MSE}(e_s, \hat{e}_t) + \mathcal{L}_{RNNT}(t|e_s) \quad (3)$$

Equation 3 adds the mean squared error (MSE) of the encoded textual representation ($\hat{e}_t$) 312 and the encoded audio representation ($e_s$) 314 to RNN-T model alignments between predicted text targets and the encoded audio representations ($e_s$) 314 to determine the modality loss ($\mathcal{L}_{MM}$) 752. Here, the encoded audio representations 314 serve as a ground-truth label to train the alignment model 600 to generate alignment outputs 602 that align to the corresponding non-synthetic speech utterances 304. The training process 700 may use the modality loss 752 to update parameters of the alignment model 600. For example, the training process 700 may update parameters of the duration predictor 620 and/or the upsampler 630 (FIG. 6).

Figure 8:
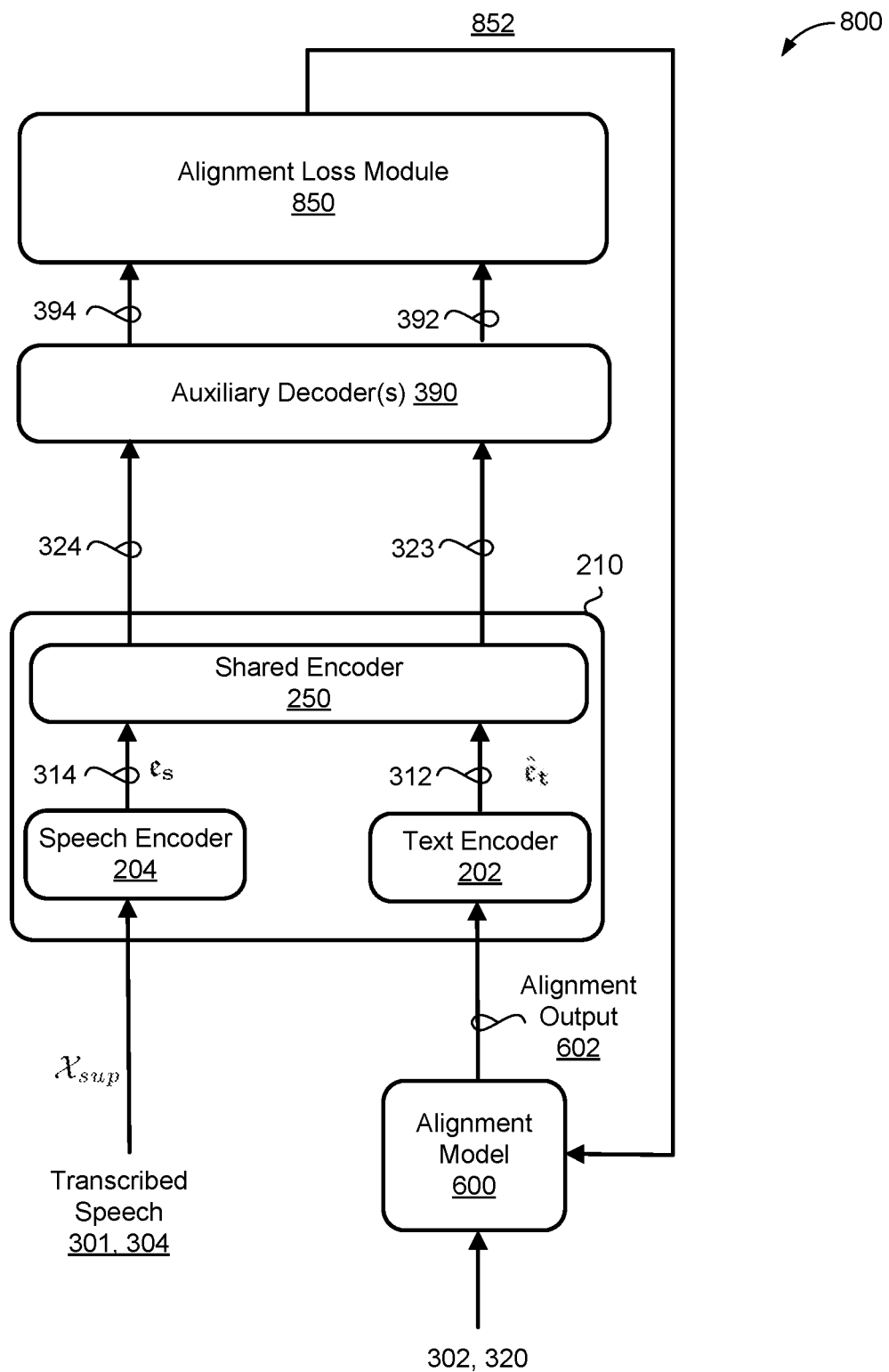
FIG. 8 is a schematic view of an example training process for training an upsampler of the alignment model.

FIG. 8 illustrates an example training process 800 for training the alignment model 600 using paired training data and unpaired training data. That is, the training process 800 uses transcribed non-synthetic speech utterances 304 that have corresponding transcriptions 302 (i.e., paired training data) and unspoken textual utterances 320 (i.e., unpaired training data) to learn speech-aligned alignment outputs 602. In the example shown, the speech encoder 204 receives, as input, each transcribed non-synthetic speech utterance 304 as a sequence of features/vectors (e.g., mel-frequency spectrograms such as the acoustic frames 110 of FIG. 1) and generates, as output, for each of a plurality of time steps, an encoded audio representation ($e_s$) 314 that corresponds to the transcribed non-synthetic speech utterance 304 at the corresponding time step. In parallel, the alignment model 600 receives the transcription 302 corresponding to the same non-synthetic speech utterance 304 and generates an alignment output 602 according to Equation 1. Additionally or alternatively, the alignment model 600 may receive the unspoken textual utterance 320 and generate an alignment output 602 according to Equation 2. The text encoder 202 receives, as input, alignment output 602 and generates, as output, for each of a plurality of time steps, an encoded textual representation ($\hat{e}_t$) 314.

The audio encoder 210 may include a shared encoder 250 that receives, as input, the encoded textual representations 312, and generates, as output, a first encoded shared representation 322. The shared encoder 250 may also receive, as input, the encoded audio representations 314 and generate, as output, a second encoded shared representation 324. An auxiliary decoder 390 receives, as input, the first and second encoded shared representations 322, 324 and generates, as output, corresponding first and second probability distributions 392, 294 over possible speech recognition hypotheses.

An alignment masked loss module 850 receives the first probability distribution 392 corresponding to the encoded textual representation 312 and the second probability distribution 394 corresponding to the encoded audio representation 314 and generates an alignment loss 852 as follows.

$$\mathcal{L}_{A\text{-}MLM} = \mathcal{L}_{RNNT}(t|\text{Mask}(\hat{e}_t)) \quad (4)$$

The alignment loss 852 from Equation 4 may be applied over the masked, sampled encoded textual representations 312 in a frequency and time domain. Notably, the alignment loss 852 may be used as a training objective for both paired training data and unpaired training data. The training process 800 may use the alignment loss 852 to update parameters of the alignment model 600. For example, the training process 800 may update parameters of the duration predictor 620 and/or the upsampler 630 (FIG. 6).

Referring back to FIG. 3A, in some implementations, the audio encoder 210 includes a speech encoder 204 and a text encoder 202, described in more detail with reference to FIGS. 3B and 3C. In the example shown, the audio encoder 210 (alternatively the speech encoder 204 or the text encoder 202 (FIGS. 3B and 3C)) includes a Conformer encoder including a stack of conformer blocks each of which includes a series of multi-headed self attention, depth wise convolution, and feed-forward layers. Alternatively, the audio encoder 210 may include another type of encoder having a stack of self-attention layers/blocks, such as a transformer encoder. The Conformer encoder 210 can naturally be split into a feature encoder, including a convolution subsampling block 212, and a context network, including a linear layer 214 and a stack of Conformer blocks 216. In some implementations, the convolution subsampling block 212 has two two-dimensional-convolution layers, both with strides (2, 2), resulting in a 4× reduction in the feature sequence length. The convolution subsampling block 212 receives, as input, a sequence of input features/vectors (e.g., mel-frequency spectrograms such as the acoustic frames 110 of FIG. 1) associated with each transcribed non-synthetic speech utterance 304 and each un-transcribed non-synthetic speech utterance 306, and generates, as output, for each of a plurality of output steps, an encoded audio feature 211 that corresponds to a respective one of the transcribed non-synthetic speech utterances 304 or a respective one of the un-transcribed non-synthetic speech utterances 306. The convolution subsampling block 212 may receive, as input, each alignment output 602 and generate, as output, for each of the plurality of output steps, an encoded textual feature 213 that corresponds to a respective one of the alignment outputs 602.

The encoded audio and textual features 211, 213 (i.e., interchangeably referred to as "encoded features 211, 213") output from the convolution subsampling block 212 may be fed to a masking module 218 where some of the encoded features 211, 213 are randomly chosen and replaced with a trained feature vector shared between all masked time steps to provide corresponding masked encoded audio features 211, 211m and masked encoded textual features 213, 213m.

In some examples, the masking module 218 masks the randomly chosen encoded features 211, 213 for masking by randomly sampling without replacement a certain proportion p of all time steps to be start indices and then masks the subsequent M consecutive time steps from every sample index, whereby some spans may overlap. After masking is applied, the linear layer 214 and the Conformer blocks 216 of the context network receives the masked encoded features 211m (or encoded features 211, 213 not chosen by the masking module 218) and outputs corresponding contrastive context vectors (i.e., encoded representation) 215 from masked encoded features 211m, 213m. Moreover, a quantizer 217 receives the encoded features 211, 213 as input, and generates quantized vectors (i.e., target context vectors) 219 as output. Thereafter, a contrastive loss module 315 derives a contrastive loss ($L_{w2v}$) 316 between the contrastive context vectors 215 at the masked positions and the target context vectors 219 as follows.

$$\mathcal{L}_{w2v} = -\log \frac{\exp(sim(c_t, q_t)/k)}{\sum_{\tilde{q} \sim Q_t} \exp(sim(c_t, \tilde{q})/k)} \quad (5)$$

where $c_t$ is contrastive context vector 215 centered over a masked time step t and $q_t$ represents a target context vector 219 at the time step t in a set of K+1 candidate target context vectors 219 which includes $q_t$ and K distractors. Distractors may be uniformly sampled from other masked time steps of the same utterance.

The contrastive loss 316 is optimized between the contrastive context vectors 215 at the masked positions and the target context vectors 219. After the audio encoder 210 converges on the un-transcribed non-synthetic speech utterances 306, the pre-training procedure is repeated on both the alignment outputs 602 corresponding to the unspoken textual utterance 320 and the transcribed non-synthetic speech utterances 304. Thus, the contrastive loss ($L_{w2v}$) is optimized for both real/human (non-synthetic) and unspoken textual utterances 320 represented by alignment outputs 602, with additional auxiliary losses on the transcribed non-synthetic speech utterances 304 and the alignment outputs 602 as described in greater detail below with reference to FIG. 3B. Accordingly, the training process 300a pre-trains the audio encoder 210 on the derived contrastive loss 316 applied on the corresponding encoded features 211, 213 associated with each alignment output 602, each transcribed non-synthetic speech utterance 304, and each un-transcribed non-synthetic speech utterance 306 provided as input to the audio encoder 210. Pre-training the audio encoder 210 may include updating parameters of the audio encoder 210 based on the contrastive losses 316.

Referring to FIG. 3B, the supervised loss part 300b of the training process 300 is configured to inject lexical information into the audio encoder 210 during pre-training based on supervised loss terms 342, 344 derived from the transcribed non-synthetic speech utterances 304 and the alignment outputs 602 corresponding to unspoken textual utterances 320 output by the alignment model 600. Notably, the supervised loss part 300b leverages one or more auxiliary decoders 390 for generating the supervised loss terms 342, 344. The auxiliary decoders 390 may include Connectionist Temporal Classification (CTC) decoders, Listen Attend Spell (LAS) decoders, or RNN-T decoders. These auxiliary decoders 390 may include at least one of a phoneme decoder configured to decode a sequence of phonemes or a wordpiece decoder configured to decode a sequence of word pieces. The auxiliary decoders 390 could also include a grapheme decoder configured to decode a sequence of graphemes.

During the supervised loss part 300b, the text encoder 202 of the audio encoder 210 is configured to receive alignment outputs 602 (i.e., text embeddings) from the alignment model 600 and the speech encoder 204 is configured to receive transcribed non-synthetic speech utterances 304. That is, the text encoder 202 of the audio encoder 210 generates encoded textual representations 312 for alignment outputs 602 (e.g., corresponding to an unspoken textual utterance 320) and the speech encoder 204 of the audio encoder 210 generates encoded audio representations 314 for speech inputs (i.e., transcribed non-synthetic speech utterances 304). Here, the encoded textual representations 312 and the encoded audio representations 314 may not both be compatible with the auxiliary decoders 390. Thus, the audio encoder 210 may also include a shared encoder 250 that receives the encoded textual representations 312 as input, and generates a first encoded shared representation 322 ($e_{text}$) as output. Moreover, the shared encoder 250 receives the encoded audio representations 314 as input, and generates a second encoded shared representation ($e_{sup}$) 324 as output. Accordingly, the shared encoder 250 generates the first and second encoded shared representations 322, 324 into a shared latent representation space compatible with the auxiliary decoder 390.

In particular, the shared encoder 250 receives, as input, each encoded textual representation 312 that corresponds to the alignment output 602 generated from the unspoken textual utterance 320 and generates, as output, for each of a plurality of time steps, the first encoded shared representation ($e_{text}$) 322 that corresponds to the alignment output 602 at the corresponding time step. The auxiliary decoder 390 including the phoneme decoder or the wordpiece decoder receives, as input, each first encoded shared representation 322 output from the shared encoder 250 and generates, as output, a first probability distribution 392 over possible speech recognition hypotheses for the corresponding alignment output 602 at the corresponding time step. In some examples, the first probability distribution 392 over possible speech recognition hypotheses includes one of possible phoneme labels, possible word piece labels, or possible grapheme labels. Thereafter, a supervised loss module 340 may determine an alignment output loss term 342 based on the first probability distribution 392 over possible speech recognition hypotheses for the alignment output 602 corresponding to the unspoken textual utterance 320. Here, the corresponding unspoken textual utterance 320 in which the alignment output 602 is generated from also serves as a ground-truth transcription 302. The supervised loss part 300b may pre-train the audio encoder 210 on the alignment output loss term 342 by updating parameters of the audio encoder 210 using the alignment output loss term 342.

Similarly, during the supervised loss part 300b, the shared encoder 250 receives, as input, each transcribed encoded audio representation 314 that corresponds to the non-synthetic speech utterance 304 and generates, as output, for each of a plurality of time steps, a second encoded shared representation ($e_{sup}$) 324 that corresponds to the transcribed non-synthetic speech utterance 304 at the corresponding time step. The auxiliary decoder 390 including the phoneme decoder or the wordpiece decoder receives, as input, each second encoded shared representation 324 output from the shared encoder 250 and generates, as output, a second probability distribution 394 over possible non-synthetic speech recognition hypotheses for the corresponding transcribed non-synthetic speech utterance 304 at the corresponding time step. In some examples, the second probability distribution 394 over possible non-synthetic speech recognition hypotheses includes the one of possible phoneme labels, the possible word piece labels, or the possible grapheme labels. Thereafter, the supervised loss module 340 may determine a non-synthetic speech loss term 344 based on the second probability distribution 394 over possible non-synthetic speech recognition hypotheses and the corresponding transcription 302 paired with the transcribed non-synthetic speech utterance 304. Here, the corresponding transcription 302 serves as a ground-truth transcription and may include a sequence of target phonemes, target word pieces, and/or target graphemes. The supervised loss part 300b may pre-train the audio encoder 210 on the non-synthetic speech loss term 344 by updating parameters of the audio encoder 210 using the non-synthetic speech loss term 344.

In some implementations, the supervised loss part 300b of the training process 300 uses another auxiliary decoder 390 to generate a third probability distribution 393 over possible speech recognition hypotheses based on the first encoded shared representation ($e_{text}$) 322 for the alignment output 602 at the corresponding time step, whereby the supervised loss module 340 may determine another alignment output loss term 342 based on the third probability distribution 393 and the unspoken textual utterance 320 corresponding to the alignment output 602. Here, the other auxiliary decoder 390 includes the other one of the phoneme decoder, word piece decoder, or the grapheme decoder and the third probability distribution 393 over possible speech recognition hypotheses includes the other one of the possible phoneme labels, the possible word piece labels, or the possible grapheme labels. In these implementations, the other auxiliary decoder 290 also generates a fourth probability distribution 395 over possible non-synthetic speech recognition hypotheses for the corresponding second encoded shared representation 324 at the corresponding time step, whereby the supervised loss module 340 may determine another non-synthetic speech loss term 344 based on the fourth probability distribution 395 and the corresponding transcription 302 that is paired with the transcribed non-synthetic speech representation 304. Here, the fourth probability distribution 395 over possible non-synthetic speech recognition hypotheses includes the other one of the possible phoneme labels, the possible word piece labels, or the possible grapheme labels. The supervised loss part 300b of the training process 300 may similarly pre-train the audio encoder 210 on the other alignment output loss term 342 and the other non-synthetic speech loss term 344.

The un-transcribed non-synthetic speech utterances 306 and the unspoken textual utterances 320 each correspond to "unpaired" training data whereby the contrastive loss ($L_{w2v}$) 316 derived from the unspoken textual utterances ($X_{text}$) 320 may be combined with the supervised loss $\mathcal{J}_{aux}$ associated with the alignment output loss term 342 to obtain an unspoken textual loss function, $\mathcal{J}_{text}$, as follows.

$$\mathcal{J}_{text} = \mathcal{L}_{w2v}(x|\theta_e) + \mathcal{L}_{aux}(y|x,\theta_e,\theta_d) \quad (6)$$

Likewise, the contrastive loss ($L_{w2v}$) 316 derived from the un-transcribed non-synthetic speech utterances ($X_{unsup}$) 306 may be used to express an unsupervised speech loss function, $\mathcal{J}_{unsup\_speech}$, as follows.

$$\mathcal{J}_{unsup\_speech} = \mathcal{J}_{w2v}(x^*|\theta_e) \quad (7)$$

During pre-training of the audio encoder 210, the alignment outputs 602 and the un-transcribed non-synthetic utterances 306 may be separated or mixed within each batch. In order to force the audio encoder 210 to learn representations that are effective for both alignment outputs 602 corresponding to unspoken textual utterances 320 and non-synthetic (human/real) speech, the loss mask a is applied when combining the loss functions $\mathcal{J}_{text}$ and of Equations. 5 and 6 to obtain an unpaired data loss function, $\mathcal{J}_{unpaired}$, as follows.

$$\mathcal{J}_{unpaired} = \alpha \mathcal{J}_{text} + (1-\alpha) \mathcal{J}_{speech} \quad (8)$$

The transcribed non-synthetic speech utterances 304 corresponds to "paired" and "supervised" training data whereby the derived contrastive loss $L_{w2v}$ and the derived supervised loss $\mathcal{J}_{aux}$ associated with the non-synthetic speech loss term 344 may be combined to obtain a paired data loss function, $\mathcal{J}_{paired}$, as follows.

$$\mathcal{J}_{paired} = \mathcal{L}_{w2v}(x|\theta_e) + \mathcal{L}_{aux}(y|x,\theta_e,\theta_d) \quad (9)$$

Referring to FIG. 3C, the consistency regularization part (i.e., modality matching part) 300c of the training process 300 is configured to promote the audio encoder 210 to learn consistent predictions between non-synthetic speech (e.g., real/human speech) and alignment outputs 602 corresponding to unspoken textual utterances 320 by generating a consistent loss term ($\mathcal{J}_{cons}(\theta)$) 352 between training utterance pairs 301 that each include a corresponding one of the transcribed non-synthetic speech utterances ($X_{sup}$) 304 and a paired alignment output 604 of the same utterance as the corresponding transcribed non-synthetic speech utterance 304. As such, the non-synthetic speech utterance 304 and the paired alignment output 604 of each training utterance pair 301 is associated with a same ground-truth transcription. In short, the consistent loss term 352 between the transcribed non-synthetic speech utterance 304 and paired alignment output 604 of the same training utterance provides an unsupervised training aspect by encouraging the audio encoder 210 to behave consistently regardless of whether the training utterance belongs to non-synthetic speech (i.e., speech training data) or the alignment output (i.e., text training data) and independent of supervised loss terms between the ground-truth transcription 302 and each of: non-synthetic speech recognition hypotheses output by the auxiliary decoder 390; and speech recognition hypothesis output by the auxiliary decoder 390.

Similar to the alignment outputs 602 generated from the unspoken textual utterances 320 in FIG. 3B, the alignment model 600 may generate each paired alignment output 604 using the corresponding transcription 302 that is paired with the transcribed non-synthetic speech utterance 304. Here, the non-synthetic speech representation 304 is associated with paired alignment output 604 generated by the alignment model 600 mapping the unspoken textual utterance 320 into speech frames.

During the consistency regularization part 300c, the text encoder 202 receives, as input, each paired alignment output 604 and generates, as output, for each of a plurality of time steps, an encoded textual representation 313 that corresponds to the paired alignment output 604 at the corresponding time step. The shared encoder 250 receives, as input, the encoded textual representation 313 and generates, as output, a first encoded shared representation ($e^*_{sup}$) 323. The auxiliary decoder 390 including the phoneme decoder or the wordpiece decoder receives, as input, each first encoded shared representation 323 output from the shared encoder 250 and generates, as output, a first probability distribution 311 over possible speech recognition hypotheses for the corresponding paired alignment output 604 at the corresponding time step. In some examples, the first probability distribution 311 over possible speech recognition hypotheses includes one of possible phoneme labels or possible word piece labels.

Similarly, the speech encoder 204 receives, as input, each transcribed non-synthetic speech utterance 304 as a sequence of features/vectors (e.g., mel-frequency spectrograms such as the acoustic frames 110 of FIG. 1) and generates, as output, for each of a plurality of time steps, a encoded audio representation 314 that corresponds to the transcribed non-synthetic speech utterance 304 at the corresponding time step. The shared encoder 250 receives, as input, the encoded audio representation 314 and generates, as output, a second encoded shared representation ($e_{sup}$) 324. The auxiliary decoder 390 including the phoneme decoder or the wordpiece decoder receives, as input, each second encoded shared representation 324 output from the shared encoder 250 and generates, as output, a second probability distribution 394 over possible non-synthetic speech recognition hypotheses for the corresponding transcribed non-synthetic speech utterance 304 at the corresponding time step. In some examples, the second probability distribution 394 over possible non-synthetic speech recognition hypotheses includes the one of the possible phoneme labels or the possible word piece labels.

With continued reference to FIG. 3C, the consistency regularization part 300c of the training process 300 further determines, at each of the plurality of time steps for each training utterance pair 301, the consistent loss term ($\mathcal{J}_{cons}(\theta)$) 352 for the corresponding training utterance pair 301 based on the first probability distribution 311 over possible speech recognition hypotheses and the second probability distribution 394 over possible non-synthetic speech recognition hypotheses. For instance, the training process 300 may employ a consistency loss term module 350 configured to receive, at each time step, the corresponding non-synthetic speech and speech recognition results 311, 394 output by the auxiliary decoder 390, and determine the consistency loss term 352 for the corresponding training utterance pair 301 at the time step.

In some examples, the consistency regularization part 300c of the training process 300 determines the consistent loss term 352 based on a Kullback-Leibler divergence ($D_{KL}$) between the first probability distribution 311 over possible speech recognition hypotheses and the second probability distribution 394 over possible non-synthetic speech recognition hypotheses. The consistent loss term 352 based on $D_{KL}$ may be expressed by the following equation.

$$\mathcal{J}_{cons}(\theta) = D_{KL}(p_\theta(y|x) \| p_\theta(y|\hat{x})) \tag{10}$$

Here, the consistent loss term 352 determined for the training utterance pair 301 at each time step provides an "unsupervised" loss term that is independent of the accuracy of the auxiliary decoder 390 (e.g., independent of the supervised loss terms 342, 344 of FIG. 3B), and thus, may be employed to update parameters of the audio encoder 210 for promoting consistency between non-synthetic speech representations and alignment outputs of the same utterances. In batch training, the consistent loss term 352 may correspond to an average loss term obtained for the batch. In other words, the consistent loss term 352 permits the audio encoder 210 to learn to behave the same, e.g., make consistent encoded representation predictions on both non-synthetic speech (e.g., real/human speech) and alignment outputs of a same training utterance, regardless of whether the training utterance belongs to non-synthetic speech or alignment outputs.

Lastly, the training process 300 may combine the unpaired data loss function ($\mathcal{J}_{unpaired}$), the paired data loss function ($\mathcal{J}_{paired}$), and the consistent loss term (eons) to obtain an overall loss term, $\mathcal{J}_{tts4pretrain2}$, that may be expressed as follows.

$$\mathcal{J}_{tts4pretrain2} = \mathcal{J}_{unpaired} + \lambda_1 \mathcal{J}_{paired} + \lambda_2 \mathcal{J}_{cons} \tag{11}$$

where $\lambda_1$ may be equal to 1.0 and $\lambda_2$ is equal to 0.1. The training process 300 may pre-train the audio encoder 210 using the overall loss term, $\mathcal{J}_{tts4pretrain2}$, by updating parameters of the audio encoder 210 to effectively teach the audio encoder 210 to learn shared representations between speech and text. After pre-training the audio encoder 210, the training process 300 may fine-tune the pre-trained audio encoder on transcribed speech utterances that may include supervised training samples of both alignment outputs corresponding to unspoken textual utterance 320 and non-synthetic (e.g., human speech).

In some implementations, the training process 300 for pre-training the audio encoder 210 applies encoder consistency regularization. Unlike decoder consistency regularization applied to auxiliary decoder(s) during the consistency regularization part 300c that requires hypothesized labels (e.g., transcripts 302 and unspoken textual utterances 320), encoder consistency regularization does not require hypothesized labels and therefore has the advantage being allowed to be applied to all the training data 304, 306, 320. Encoder consistency regularization may be applied via Hierarchical Contrastive consistency Regularization (HCCR) techniques where encoder activations e, e* from original/non-augmented and augmented speech are projected through an auxiliary network to generate z and z*. Thereafter, positive and negative pairs are constructive and a contrastive loss $l_{t,z,z^*}$ is calculated as follows.

$$l_{t,z,z^*} = -\log \frac{\exp(sim(z_t^*, z_t)/\tau)}{\sum_{k=1}^{T} \exp(sim(z_t^*, z_k)/\tau)} \tag{12}$$

Specific to HCCR, a Convolutional Neural Network (CNN) projection network may calculate projections over increasing length segments of encoder activations e (30, 50, 120 ms) to yield 3 views (V) and draw negative examples from the same utterance for short segments, and from other utterances in the batches with 120 ms segments. Accordingly, an HCCR loss may be calculated over the transcribed non-synthetic speech utterances 304 (paired speech), the un-transcribed non-synthetic speech utterances 306 (unpaired speech), and the alignment outputs 602 generated from the unspoken textual utterances 320 as follows.

$$\mathcal{L}_{enc\_cons} = \sum_{v=1}^{V} \sum_{t=1}^{T^{(v)}} l_{t,z^{*(v)},z^{(v)}} \tag{13}$$

The HCCR loss calculated by Equation 13 may be added to Equation 11 with a coefficient of 1e-3 as part of the overall loss term, $\mathcal{J}_{tts4pretrain2}$, for use in pre-training the audio encoder 210.

Implementations described above describe the training process 300 training the pre-training the audio encoder 210, however, it is understood that the training process 300 may also be employed to train/pre-train a monolingual ASR model 200 or a multilingual ASR model 200. In some instances, the training process 300 may be employed to train end-to-end ASR models with decoder structures (i.e., non-pre-training) or fine-tune an ASR model to perform downstream tasks such as speech translation or natural language understanding. Moreover, the training process 300 may be used with training data source including unspoken textual utterances 320, transcribed non-synthetic speech utterances 304, and untranscribed non-synthetic speech utterances 306 independently, or using some combination thereof.

Figure 4:
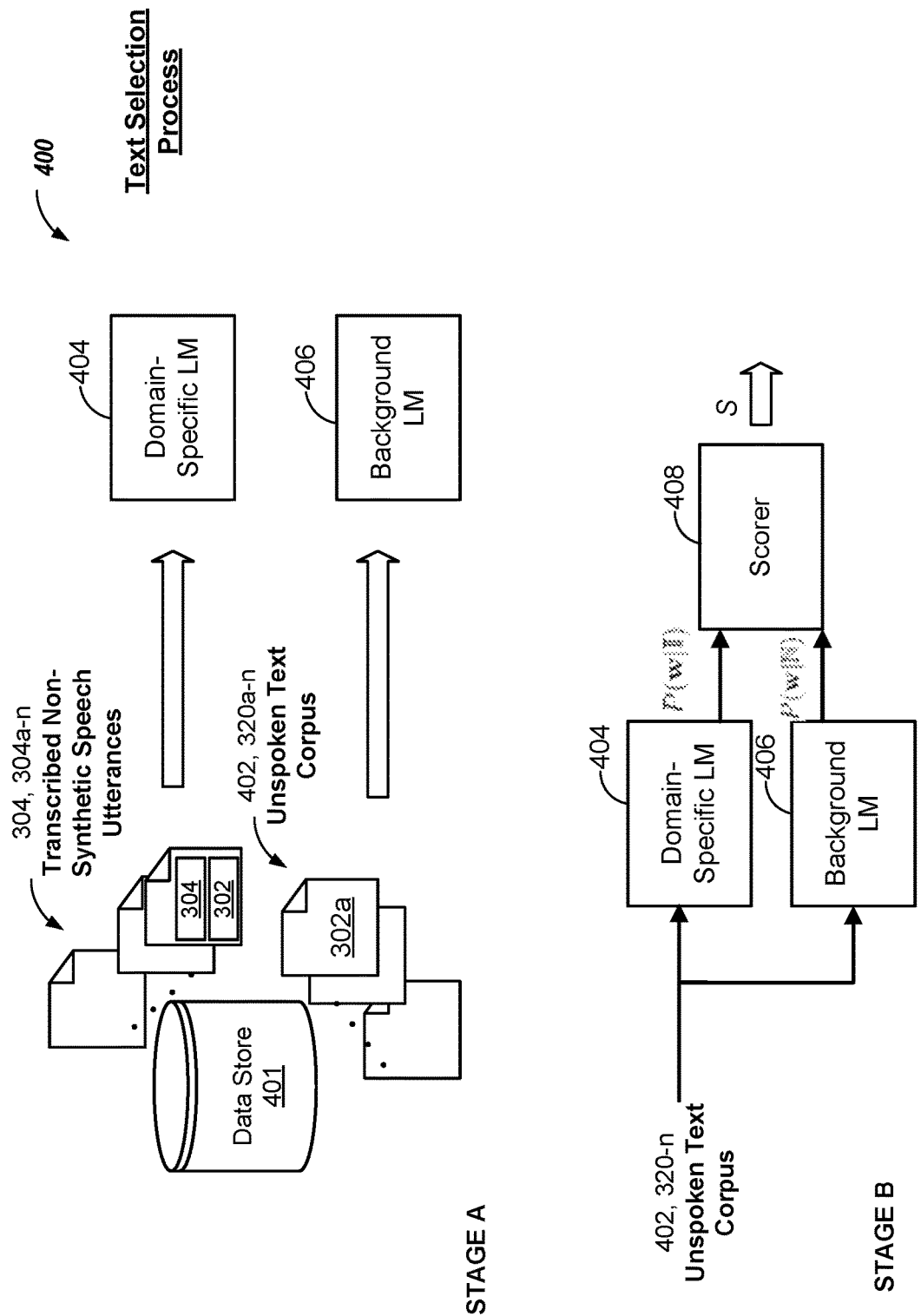
FIG. 4 is a schematic view of an example unspoken text selection process for selecting unspoken textual utterances pertaining to a specific domain.

Referring to FIG. 4, a contrastive unspoken text selection process 400 may select the unspoken textual utterances 320 used for pre-training the audio encoder 210 from a large unspoken text corpus 402, whereby the selected unspoken textual utterances 320 are most similar to a specific domain the audio encoder 210 is being pre-trained to learn. That is, the text selection process 400 is able to identify in- and near-domain unspoken text from the unspoken text corpus 402 for inclusion in the unspoken textual utterances 320 for use in pre-training the audio encoder 210. Notably, unspoken textual utterances 320 selected by the selection process 400 enables the synthesizing of distinct utterances on-the-fly during batch construction such that a new speaker embedding z and latent variable Z may be sampled each time an unspoken textual utterance 320 is in a batch.

The corpus of unspoken text 402 includes a multitude of unspoken textual utterances 320, 320a-n from across a large range of domains, and includes a far greater linguistic diversity than the specific domain in which the audio encoder 210 is being trained to learn. As mentioned previously, the set of transcribed non-synthetic speech utterances 304 may be domain-specific in that they pertain to the specific domain and each non-synthetic speech utterance 304 is paired with a corresponding transcription 302. The corpus of unspoken text 402 may be stored in the same or different data store 401 as the spoken training utterances 304. The corpus of unspoken text 402 may dynamically change to incorporate new unspoken textual utterances 320. Simply using all unspoken textual utterances 320 in the unspoken text corpus 402 is not feasible for the following reasons: i) for each sentence, the speech modality needs much more memory to be encoded than text, thereby making converting all text in the corpus 402 impractical; and ii) the vast amount of difference between the transcriptions 302 paired with the transcribed non-synthetic speech utterances 304 and the unspoken textual utterances 320 in the unspoken text corpus 402 requires intelligent strategies to balance their contributions.

The text selection process 400 aims to select a subset of the available unspoken textual utterances 320 from the unspoken text corpus 402 as the data for TTS synthesis resulting in the alignment outputs generated for pre-training the audio encoder 210 during the contrastive loss and supervised loss parts 300a, 300b of the training process 300 described above with reference to FIGS. 3A and 3B. Stated differently, the text selection process 400 aims to improve the match between the selected subset of the available unspoken textual utterances 320 and the specific domain being targeted, which in turn reduces the computational resources required to exploit a large amount of non-domain-specific data. Accordingly, the text selection process 400 reduces computational and memory costs by selecting unspoken textual utterances 320 that best match the specific domain the audio encoder 210 is being trained to learn.

In some examples, the text selection process 400 selects the subset of the available unspoken textual utterances 320 from the corpus 402 that best match the specific domain by simply providing a domain identifier (not shown) associated with the specific domain as an input to the background LM 406 previously trained on the entire unspoken text corpus 402. As mentioned previously, the unspoken text corpus 402 spans a multitude of different domains. In these examples, the background LM 406 may include a maximum entropy (MaxEnt LM) capable of optionally accepting the domain identifier as input as described in U.S. Pat. No. 9,842,592, filed on Feb. 12, 2014, the contents of which is incorporated herein by reference in its entirety. Here, the domain identifier associated with the specific domain may allow the MaxEnt LM to output a subset of the available unspoken textual utterances 320 from the corpus 402 that are likely to include words and/or phrases pertaining to the specific domain. In some configurations, rather than evaluating likelihood of words, a statistical language model operates in reverse mode to randomly generate a text phrase that matches a statistical distribution of words pertaining to the specific domain.

In additional examples, and as depicted in FIG. 4, the text selection process 400 uses the transcriptions 302 paired with the transcribed non-synthetic speech utterances 304 spoken by human speakers to select the subset of the available unspoken textual utterances 320 from the corpus 402 that best match the specific domain. Here, the transcribed non-synthetic speech utterances 304 include words, phrases, and/or other terminology pertaining to the specific domain. Optionally, in addition to, or in lieu of the transcriptions 304 paired with the transcribed non-synthetic speech utterances 304, a set of different transcribed utterances that pertain to the specific domain can be used for selecting the unspoken textual utterances 320. This would provide the advantage of not requiring all the transcribed non-synthetic speech utterances 304 to belong to the specific domain.

During a first stage (STAGE A), the unspoken text selection process 400 builds the two language models 404, 406 to enable contrastive selection of the unspoken textual utterances 320. Here, the domain-specific LM 410 is trained on each transcription 302 in the set of transcribed non-synthetic speech utterances 304. The set of transcribed non-synthetic speech utterances 304 is assumed to belong to the specific-domain for which the audio encoder 210 is being trained to learn. On the other hand, the background LM 406 is trained on each unspoken textual utterance 320 in the entire unspoken text corpus 402. As mentioned previously, the unspoken text corpus 402 spans a multitude of different domains. In some examples, the first stage uses n-gram language model training to build the two language models 404, 406. In other examples, the first stage uses neural network language model training to build the two language models 404, 406.

During a second state (STAGE B), the unspoken text selection process 400 uses the two contrastive LMs 404, 406 to evaluate each unspoken textual utterance 320 in the unspoken text corpus 402 by determining a first probability, $P(w|\mathcal{I})$, associated with each word in the unspoken textual utterance 320 appearing in the domain-specific LM 404 and determining a second probability $P(w|\mathcal{N})$, associated with each word in the unspoken textual utterance 320 appearing in in the background LM 406. Thereafter, for each unspoken textual utterance 320 in the unspoken text corpus 402, the process 400 determines, at a scorer 408, a score, S, based on the first probability, the second probability, and a number of words, #(w), appearing in the corresponding unspoken textual utterance 320. For example, the score S for each unspoken textual utterance 320 may be calculated as follows.

$$S = \frac{\log P(w|\mathcal{I}) - \log P(w|\mathcal{N})}{\#(w)} \tag{14}$$

After determining the scores, the unspoken text selection process 400 selects the unspoken textual utterances 320 with the N-best scores S as these unspoken textual utterances 320 best match the specific domain. The text corpus 402 may include billions of unspoken textual utterances 320. The unspoken textual utterances 320 selected by the selection process 400 can include millions of utterances, and thus, far exceed the number of un-transcribed non-synthetic speech utterances 304 spoken by human speakers. As discussed above, the content of the unspoken textual utterances 320 increases linguistic diversity for the specific domain the audio encoder 210 is being trained to learn, while corresponding alignment outputs 602 generated from the unspoken textual utterances 320 increases acoustic/lexical diversity for the speech that the acoustic encoder 210 is encoding as part of the speech recognition process when the acoustic encoder 210 is integrated within the ASR model 200.

Figure 5:
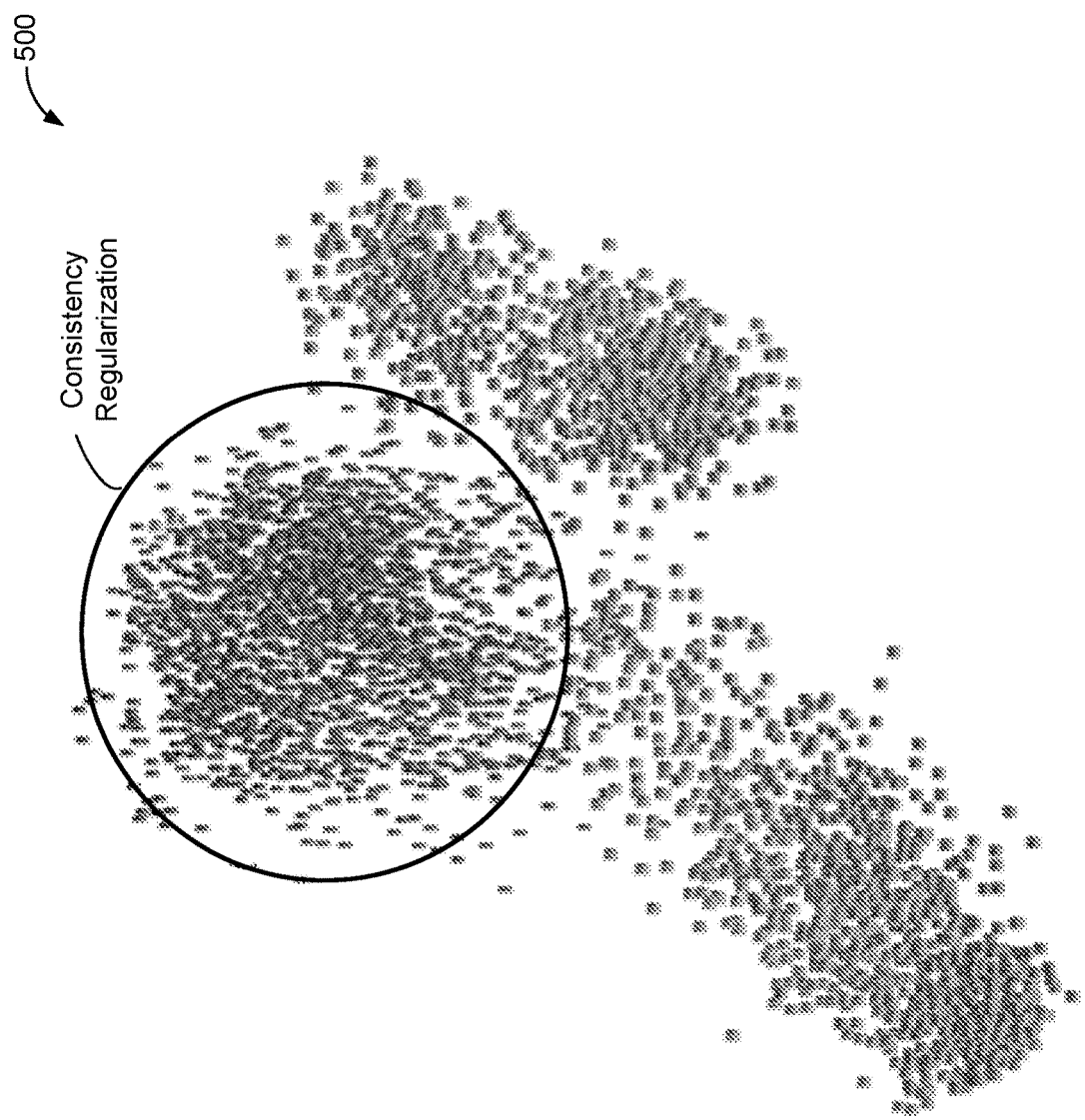
FIG. 5 is an example projection space encoder representations of non-synthetic and synthetic speech.

FIG. 5 illustrates an example projected space 500 of encoder representations of alignment outputs and non-synthetic (real/human) speech utterances. After introducing consistency regularization via the consistency regularization part 300c of FIG. 3C for pre-training the audio encoder, the resulting speech and text encoder representations learned stay much closer to each other compared to the speech and text encoder representations when consistency regularization is not applied. Accordingly, the projected space 500 shows that the use of supervised training data (i.e., the transcribed non-synthetic speech utterances) for pre-training the audio encoder 210 effectively generates improved shared speech and text representations.

Figure 9:
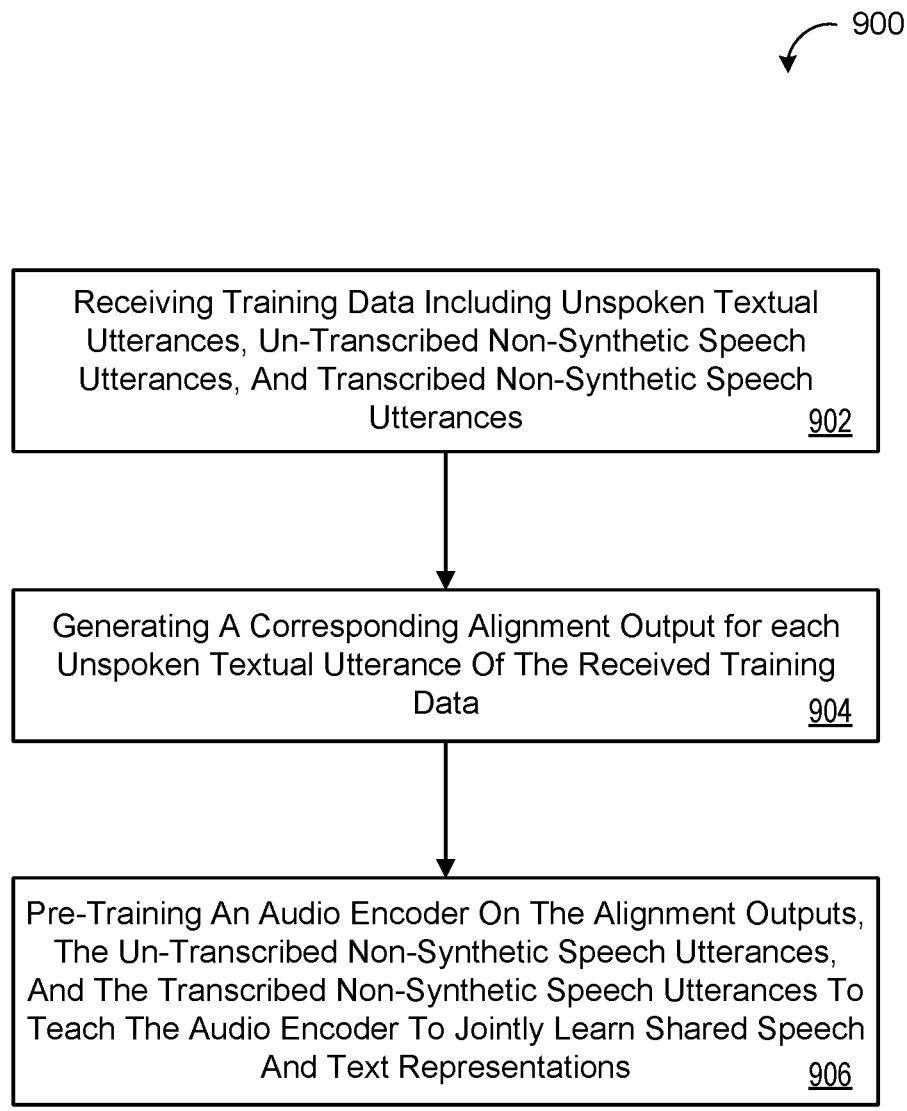
FIG. 9 is a flowchart of an example arrangement of operations for a method of pre-training an audio encoder to jointly learn shared representations of speech and text.
Figure 10:
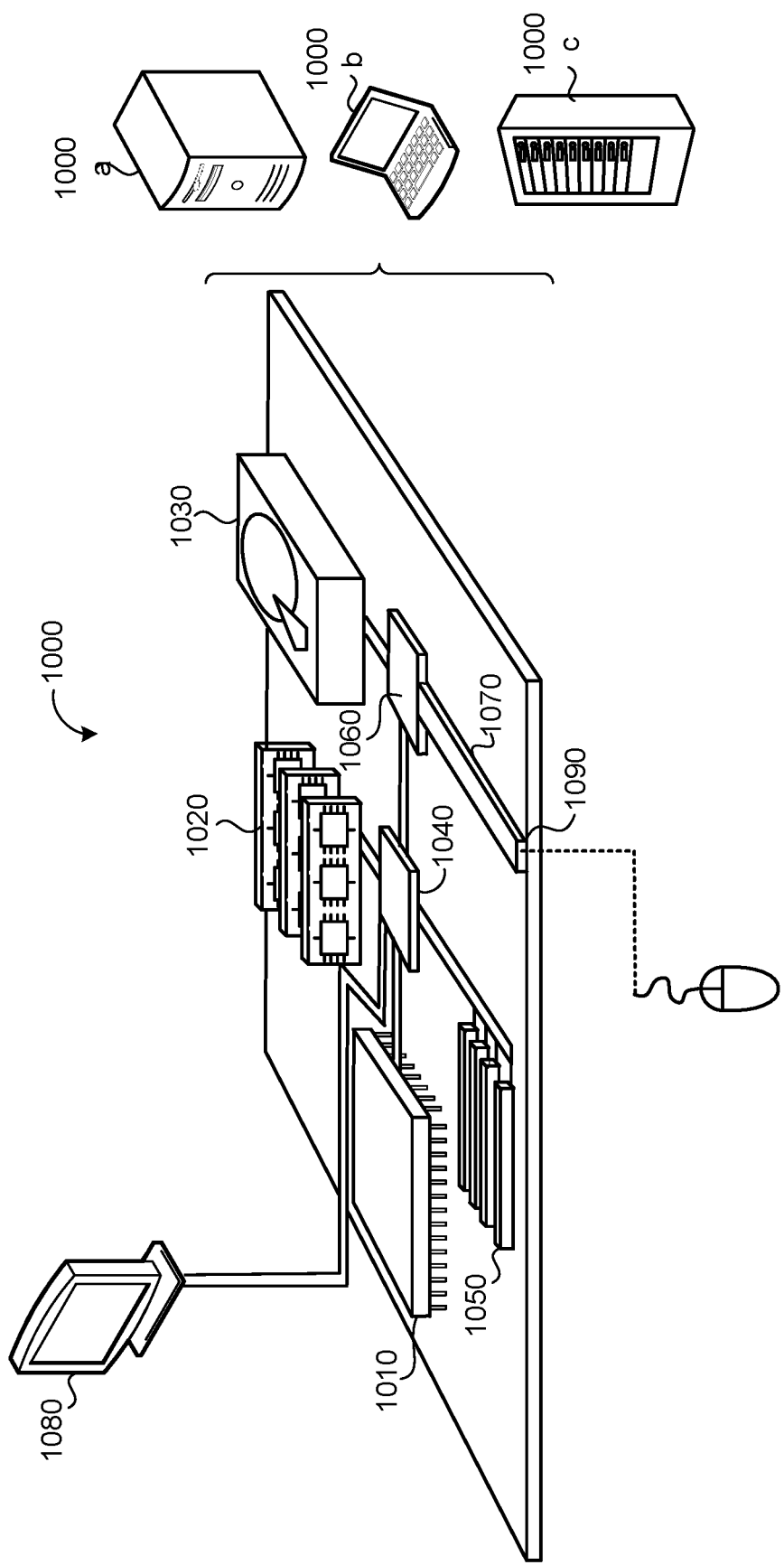
FIG. 10 is a schematic view of an example computing device that may be used to implement the systems and methods described herein.

FIG. 9 is a flowchart of an example arrangement of operations for a method 900 of pre-training an audio encoder 210 to jointly learn shared representations of speech and text. The method 900 may execute on data processing hardware 1010 (FIG. 10) using instructions stored on memory hardware 1020 (FIG. 10). The data processing hardware 1010 and the memory hardware 1020 may reside on the remote computer/server 201 of FIG. 1 corresponding to a computing device 1000 (FIG. 10).

At operation 902, the method 900 includes receiving training data that includes unspoken textual utterances 320, un-transcribed non-synthetic speech utterances 306, and transcribed non-synthetic speech utterances 304. Each unspoken textual utterance 320 is not paired with any corresponding spoken utterance of non-synthetic speech. Each un-transcribed non-synthetic speech utterance 306 not paired with a corresponding transcription. Each transcribed non-synthetic speech utterance 304 paired with a corresponding transcription 302. At operation 904, the method 900 includes generating a corresponding alignment output 602 for each unspoken textual utterance 320 of the received training data using an alignment model 600. At operation 906, the method 900 includes pre-training an audio encoder 210 on the alignment outputs 602 generated for corresponding to the unspoken textual utterances 320, the un-transcribed non-synthetic speech utterances 306, and the transcribed non-synthetic speech utterances 304 to teach the audio encoder 210 to jointly learn shared speech and text representations.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

FIG. 10 is schematic view of an example computing device 1000 that may be used to implement the systems and methods described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010, memory 1020, a storage device 1030, a high-speed interface/controller 1040 connecting to the memory 1020 and high-speed expansion ports 1050, and a low speed interface/controller 1060 connecting to a low speed bus 1070 and a storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and a low-speed expansion port 1090. The low-speed expansion port 1090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1000*a* or multiple times in a group of such servers 1000*a*, as a laptop computer 1000*b*, or as part of a rack server system 1000*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving training data comprising:
      unspoken textual utterances, each unspoken textual utterance not paired with any corresponding spoken utterance of non-synthetic speech;
      un-transcribed non-synthetic speech utterances, each un-transcribed non-synthetic speech utterance not paired with a corresponding transcription; and transcribed non-synthetic speech utterances, each transcribed non-synthetic speech utterance paired with a corresponding transcription;
for each respective unspoken textual utterance of the received training data, generating, using an alignment model, a corresponding alignment output that maps the respective unspoken textual utterance to a corresponding predicted speech duration of the respective unspoken textual utterance; and
pre-training an audio encoder on the corresponding alignment output generated for each respective unspoken textual utterance, the un-transcribed non-synthetic speech utterances, and the transcribed non-synthetic speech utterances to teach the audio encoder to jointly learn shared speech and text representations by updating parameters of the audio encoder, the audio encoder comprising a stack of self-attention layers each including a multi-headed self-attention mechanism,
wherein an automatic speech recognition (ASR) model comprising the pre-trained audio encoder is configured to receive a spoken utterance and generate a corresponding transcription of the spoken utterance.

2. The computer-implemented method of claim 1, wherein pre-training the audio encoder comprises:
for each un-transcribed non-synthetic speech utterance:
generating a corresponding encoded representation of the un-transcribed non-synthetic speech utterance; and
pre-training the audio encoder on a contrastive loss applied on the corresponding encoded representation of the un-transcribed non-synthetic speech utterance;
for each alignment output:
generating a corresponding encoded representation of the alignment output; and
pre-training the audio encoder on a contrastive loss applied on the corresponding encoded representation of the alignment output; and
for each transcribed non-synthetic speech utterance:
generating a corresponding encoded representation of the transcribed non-synthetic speech utterance; and
pre-training the audio encoder on a contrastive loss applied on the corresponding encoded representation of the transcribed non-synthetic speech utterance.

3. The computer-implemented method of claim 1, wherein pre-training the audio encoder comprises:
at each of a plurality of time steps for each alignment output:
generating, using an auxiliary decoder, a first probability distribution over possible synthetic speech recognition hypotheses for the corresponding alignment output;
determining an alignment output loss term based on the first probability distribution over possible synthetic speech recognition hypotheses and the unspoken textual utterance corresponding to the alignment output; and
pre-training the audio encoder based on the alignment output loss term; and
at each of a plurality of time steps for each transcribed non-synthetic speech utterance:
generating, using the auxiliary decoder, a second probability distribution over possible non-synthetic speech recognition hypotheses for the corresponding transcribed non-synthetic speech utterance;
determining a non-synthetic speech loss term based on the second probability distribution over possible non-synthetic speech recognition hypotheses and the corresponding transcription paired with the transcribed non-synthetic speech utterance; and
pre-training the audio encoder based on the non-synthetic speech loss term.

4. The computer-implemented method of claim 3, wherein the auxiliary decoder comprises one of a Connection Temporal Classification (CTC) decoder, a Listen Attend Spell (LAS) decoder, or Recurrent Neural Network-Transducer (RNN-T) decoder.

5. The computer-implemented method of claim 3, wherein:
the first probability distribution over possible synthetic speech recognition hypotheses comprises one of possible phoneme labels or possible word piece labels; and
the second probability distribution over possible non-synthetic speech recognition hypotheses comprises the one of the possible phoneme labels or the possible word piece labels.

6. The computer-implemented method of claim 1, wherein the audio encoder comprises a text encoder, a speech encoder, and a shared encoder.

7. The computer-implemented method of claim 6, wherein the operations further comprise:
for each alignment output:
determining, using the text encoder, an encoded textual representation of the alignment output; and
generating, using the shared encoder, a first encoded shared representation of the alignment output in a shared latent representation space; and
for each transcribed non-synthetic speech utterance:
determining, using the speech encoder, an encoded audio representation of the transcribed non-synthetic speech utterance; and
generating, using the shared encoder, a second encoded shared representation of the transcribed non-synthetic speech utterance in a shared latent representation space.

8. The computer-implemented method of claim 1, wherein generating the corresponding alignment output for each unspoken textual utterance of the received training data comprises:
extracting an initial textual representation from the unspoken textual utterance;
predicting a text chunk duration for each text chunk in the unspoken textual utterance; and
upsampling the initial textual representation using the predicted text chunk duration for each text chunk in the unspoken textual utterance.

9. The computer-implemented method of claim 1, wherein the operations further comprise training the alignment model by:
generating, using a speech encoder, an encoded audio representation for a transcribed non-synthetic speech utterance;
determining, using the alignment model, an alignment output for a transcription corresponding to the transcribed non-synthetic speech utterance;
generating, using a text encoder, an encoded textual representation for the alignment output; and
updating parameters of the alignment model based on a comparison of the encoded audio representation for the transcribed non-synthetic speech utterance and encoded textual representation for the alignment output.

10. A system comprising:
data processing hardware; and
memory hardware in communication with the data processing hardware, the memory hardware storing instructions that when executed on the data processing hardware cause the data processing hardware to perform operations comprising:
  receiving training data comprising:
    unspoken textual utterances, each unspoken textual utterance not paired with any corresponding spoken utterance of non-synthetic speech;
    un-transcribed non-synthetic speech utterances, each un-transcribed non-synthetic speech utterance not paired with a corresponding transcription; and
    transcribed non-synthetic speech utterances, each transcribed non-synthetic speech utterance paired with a corresponding transcription;
  for each respective unspoken textual utterance of the received training data, generating, using an alignment model, a corresponding alignment output that maps the respective unspoken textual utterance to a corresponding predicted speech duration of the respective unspoken textual utterance; and
  pre-training an audio encoder on the corresponding alignment output generated for each respective unspoken textual utterance, the un-transcribed non-synthetic speech utterances, and the transcribed non-synthetic speech utterances to teach the audio encoder to jointly learn shared speech and text representations by updating parameters of the audio encoder, the audio encoder comprising a stack of self-attention layers each including a multi-headed self-attention mechanism,
  wherein an automatic speech recognition (ASR) model comprising the pre-trained audio encoder is configured to receive a spoken utterance and generate a corresponding transcription of the spoken utterance.

11. The system of claim 10, wherein pre-training the audio encoder comprises:
for each un-transcribed non-synthetic speech utterance:
  generating a corresponding encoded representation of the un-transcribed non-synthetic speech utterance; and
  pre-training the audio encoder on a contrastive loss applied on the corresponding encoded representation of the un-transcribed non-synthetic speech utterance;
for each alignment output:
  generating a corresponding encoded representation of the alignment output; and
  pre-training the audio encoder on a contrastive loss applied on the corresponding encoded representation of the alignment output; and
for each transcribed non-synthetic speech utterance:
  generating a corresponding encoded representation of the transcribed non-synthetic speech utterance; and
  pre-training the audio encoder on a contrastive loss applied on the corresponding encoded representation of the transcribed non-synthetic speech utterance.

12. The system of claim 10, wherein pre-training the audio encoder comprises:
at each of a plurality of time steps for each alignment output:
  generating, using an auxiliary decoder, a first probability distribution over possible synthetic speech recognition hypotheses for the corresponding alignment output;
  determining an alignment output loss term based on the first probability distribution over possible synthetic speech recognition hypotheses and the unspoken textual utterance corresponding to the alignment output; and
  pre-training the audio encoder based on the alignment output loss term; and
at each of a plurality of time steps for each transcribed non-synthetic speech utterance:
  generating, using the auxiliary decoder, a second probability distribution over possible non-synthetic speech recognition hypotheses for the corresponding transcribed non-synthetic speech utterance;
  determining a non-synthetic speech loss term based on the second probability distribution over possible non-synthetic speech recognition hypotheses and the corresponding transcription paired with the transcribed non-synthetic speech utterance; and
  pre-training the audio encoder based on the non-synthetic speech loss term.

13. The system of claim 12, wherein the auxiliary decoder comprises one of a Connection Temporal Classification (CTC) decoder, a Listen Attend Spell (LAS) decoder, or Recurrent Neural Network-Transducer (RNN-T) decoder.

14. The system of claim 12, wherein:
the first probability distribution over possible synthetic speech recognition hypotheses comprises one of possible phoneme labels or possible word piece labels; and
the second probability distribution over possible non-synthetic speech recognition hypotheses comprises the one of the possible phoneme labels or the possible word piece labels.

15. The system of claim 10, wherein the audio encoder comprises a text encoder, a speech encoder, and a shared encoder.

16. The system of claim 15, wherein the operations further comprise:
for each alignment output:
  determining, using the text encoder, an encoded textual representation of the alignment output; and
  generating, using the shared encoder, a first encoded shared representation of the alignment output in a shared latent representation space; and
for each transcribed non-synthetic speech utterance:
  determining, using the speech encoder, an encoded audio representation of the transcribed non-synthetic speech utterance; and
  generating, using the shared encoder, a second encoded shared representation of the transcribed non-synthetic speech utterance in a shared latent representation space.

17. The system of claim 10, wherein generating the corresponding alignment output for each unspoken textual utterance of the received training data comprises:
extracting an initial textual representation from the unspoken textual utterance;
predicting a text chunk duration for each text chunk in the unspoken textual utterance; and
upsampling the initial textual representation using the predicted text chunk duration for each text chunk in the unspoken textual utterance.

18. The system of claim 10, wherein the operations further comprise training the alignment model by:
generating, using a speech encoder, an encoded audio representation for a transcribed non-synthetic speech utterance;

determining, using the alignment model, an alignment output for a transcription corresponding to the transcribed non-synthetic speech utterance;

generating, using a text encoder, an encoded textual representation for the alignment output; and updating parameters of the alignment model based on a comparison of the encoded audio representation for the transcribed non-synthetic speech utterance and encoded textual representation for the alignment output.

\* \* \* \* \*